(12) United States Patent
Kitahara et al.

(10) Patent No.: US 8,038,307 B2
(45) Date of Patent: Oct. 18, 2011

(54) PROJECTOR WITH A PROJECTION POSITION ADJUSTING DEVICE

(75) Inventors: Wataru Kitahara, Matsumoto (JP); Kunihisa Nakamura, Iida (JP); Toru Kurihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 498 days.

(21) Appl. No.: 12/353,639

(22) Filed: Jan. 14, 2009

(65) Prior Publication Data
US 2009/0219505 A1 Sep. 3, 2009

(30) Foreign Application Priority Data
Jan. 23, 2008 (JP) ................................ 2008-012939

(51) Int. Cl.
*G03B 21/14* (2006.01)
*G03B 21/22* (2006.01)
(52) U.S. Cl. ...................................... 353/101; 353/119
(58) Field of Classification Search .................. 353/100, 353/101, 69, 70, 119, 122; 359/813, 814, 359/811, 812, 823, 819, 822, 826, 827, 829; 250/239; 396/529, 530, 533, 535
See application file for complete search history.

(56) References Cited

U.S. PATENT DOCUMENTS
6,966,671 B2 * 11/2005 Lee et al. ...................... 362/285
2002/0154278 A1 * 10/2002 Masuda ........................ 353/101

FOREIGN PATENT DOCUMENTS
JP A-2004-245956 9/2004
JP A-2006-133419 5/2006
* cited by examiner

*Primary Examiner* — Georgia Y Epps
*Assistant Examiner* — Pascal M Bui Pho
(74) *Attorney, Agent, or Firm* — Oliff & Berridge PLC

(57) ABSTRACT

A projector includes a projection optical device and a projection position adjusting device that includes a fixed member defining a hole having a step portion, a first plate that supports the projection optical device and a second plate disposed between the fixed member and the first plate. The projection position adjusting device further includes a connecting member having a step and being disposed in the hole of the fixed member and connected to the first plate, and an urging member disposed between the connecting member and the step portion of the hole of the fixed member. The urging member urges the step portion of the hole and the step of the connecting member away from each other, and urges the first plate into direct contact with the fixed member.

4 Claims, 17 Drawing Sheets

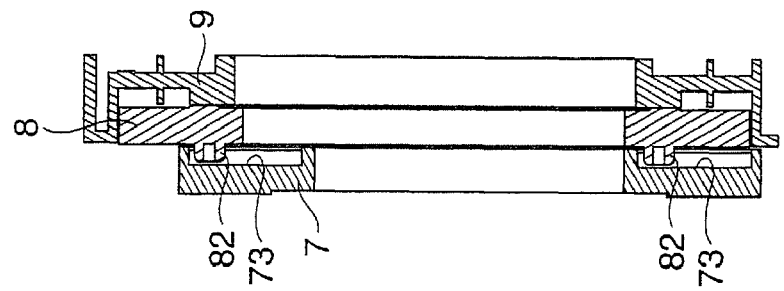
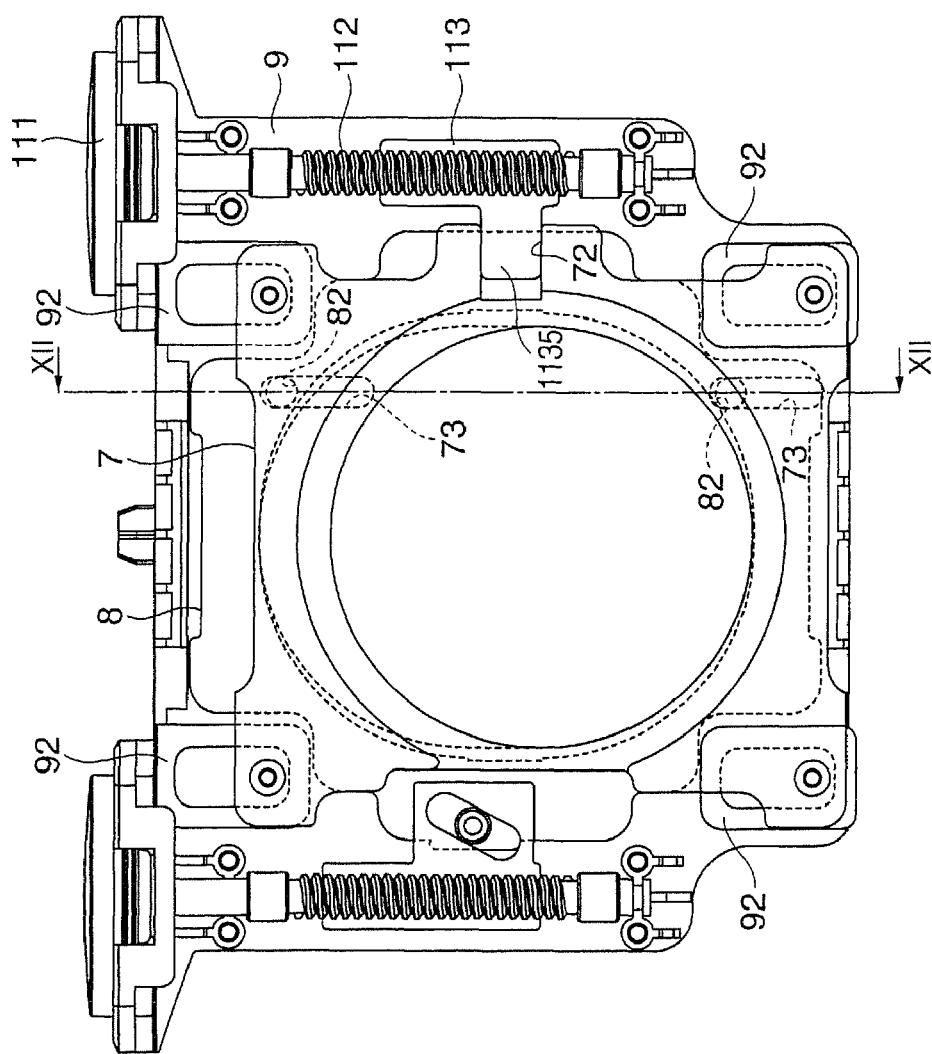
FIG. 12B
FIG. 12A

PROJECTOR WITH A PROJECTION POSITION ADJUSTING DEVICE

This application claims priority to Japanese Application No. JP 2008-012939 filed in Japan on Jan. 23, 2008, the entire disclosure of which is hereby incorporated by reference in its entirety.

BACKGROUND

1. Technical Field

The present invention relates to a projector.

2. Related Art

There is known a projector that modulates, according to image information, a light beam emitted from a light source and magnifies and projects the light beam on a screen using a projection optical device.

In such a projector, the light beam is tilt-projected upward with the projector fixed in a low position, tilt-projected downward with the projector fixed in a high position, and, besides the projection in the vertical direction, tilt-projected in the horizontal direction. Therefore, there is known a projector including a projection position adjusting device that moves, with respect to an optical system such as an optical modulation device, a projection optical device in a direction orthogonal to a direction in which a light beam is irradiated (a projecting direction) (see, for example JP-A-2006-133419).

The projection position adjusting device disclosed in JP-A-2006-133419 includes a fixed plate, a first moving plate that moves in the vertical direction and the horizontal direction in a plane orthogonal to a projecting direction, a second moving plate that engages with the first moving plate and moves in the horizontal direction together with the first moving plate, an adjusting and moving unit that moves the first moving plate and the second moving plate, and an auxiliary plate that is connected to the fixed plate and holds the first moving plate and the second moving plate between the auxiliary plate itself and the fixed plate. The fixed plate, the first moving plate, the second moving plate, and the auxiliary plate are stacked and arranged in the projecting direction in this order. Plural urging members are disposed between the first moving plate and the second moving plate. The first moving plate is urged to the fixed plate by the urging members to bring the first moving plate into contact with the fixed plate.

With such a configuration, backlash of the first moving plate (backlash of the projection optical device supported by the first moving plate) is prevented. Even when the projection optical device is moved by the projection position adjusting device, shift of a back focus position of the projection optical device is prevented and focus accuracy of a projected image projected from the projector is maintained.

However, the projection position adjusting device disclosed in JP-A-2006-133419 adopts the configuration in which the first moving plate and the second moving plate are supported by using the auxiliary plate in addition to the fixed plate and the first moving plate is brought into contact with the fixed plate by the urging members. Therefore, because a large number of members are used, it is difficult to realize a reduction in size and weight of the projection position adjusting device.

SUMMARY

An advantage of some aspect of the invention is to provide a projector that can stably maintain focus accuracy of a projected image even when a projection position is adjusted and can realize a reduction in size and weight.

According to an aspect of the invention, there is provided a projector including: a projection optical device that magnifies and projects image light; and a projection position adjusting device that moves the projection optical device in a plane orthogonal to a projecting direction and adjusts a projection position of the projection optical device. The projection position adjusting device includes: a fixed member fixed in the projector; a first moving plate that supports the projection optical device and moves in a first axial direction and a second axial direction orthogonal to each other in the plane orthogonal to the projecting direction; a second moving plate that is interposed between the fixed member and the first moving plate, engages with the first moving plate, and moves in the second axial direction together with the first moving plate; adjusting and driving units that move the first moving plate and the second moving plate; and plural coupling members that movably couple the first moving plate to the fixed member. A coupling through hole of a stepped shape, which has a diameter dimension on a side close to the first moving plate smaller than that on a side separated from the first moving plate and has a step, is formed in the fixed member. Each of the coupling members includes: a connecting member that is formed in a stepped shape, which has a sectional area on the other end side smaller than that on the one end side and has steps, and the other end of which is connected to the first moving plate in a state in which the connecting member is inserted in the coupling through hole; and an interposed member that is arranged between the step of the connecting member and the step of the coupling through hole, urges the step of the connecting member and the step of the coupling through hole in directions away from each other, and brings the first moving plate into contact with the fixed member.

In the aspect of the invention, the projection position adjusting device includes the plural coupling members that movably couple the first moving plate from an end face side opposite to an end face opposed to the first moving plate in the fixed member to the fixed member. Consequently, unlike in the past, it is possible to attach the first moving plate and the second moving plate to the fixed member using the plural coupling members without requiring the auxiliary plate that holds the first moving plate and the second moving plate between the auxiliary plate itself and the fixed member.

Each of the coupling members includes: the connecting member of the stepped shape that is inserted through the coupling through hole of the stepped shape formed in the fixed member and the end of which is connected to the first moving plate; and the interposed member that is arranged between the step of the connecting member and the step of the coupling through hole, urges the steps in directions away from each other, and brings the first moving plate into contact with the fixed member. Consequently, unlike in the past, it is possible to urge the first moving plate to the fixed member using the coupling member without requiring the plural urging members disposed between the first moving plate and the second moving plate.

As explained above, according to the aspect of the invention, it is possible to omit the auxiliary plate and the plural urging members in the past and reduce the number of components and to realize a reduction in size and weight of the projection position adjusting device.

Moreover, because the first moving plate is brought into contact with the fixed member by the plural coupling members, it is possible to prevent backlash of the first moving plate (backlash of the projection optical device supported by the first moving plate). Even when the projection optical device is moved by the projection position adjusting device, it is possible to prevent shift of a back focus position of the projection optical device and stably maintain focus accuracy of a projected image projected from the projector.

Preferably, the interposed member includes: a first pressing member that has a first through hole, through which the connecting member is inserted and the connecting member is movable in one of the axial directions, and moves in the other axial direction together with the first moving plate while coming into contact with the step of the coupling through hole; a second pressing member that has a second through hole, through which the connecting member is inserted, moves in the other axial direction together with the first pressing member, and moves in the one axial direction together with the first moving plate with respect to the first pressing member while coming into contact with the first pressing member; and an urging member that is arranged between the second pressing member and the step of the connecting member and urges the second pressing member and the step of the connecting member in directions away from each other.

When the first pressing member and the second pressing member are formed by one member (hereinafter referred to as pressing member) as the interposed member, it is difficult to realize a reduction in size of the projection position adjusting device as explained below.

Because the first moving plate is attached to the fixed member, the interposed member needs to urge the step of the connecting member and the step of the coupling through hole in directions away from each other. Therefore, the pressing member needs to be always in contact with the step not to slip out of the step of the coupling through hole when the first moving plate moves. In other words, the pressing member needs to have size enough for not slipping out of the step of the coupling through hole according to moving ranges in the first axial direction and the second axial direction in the first moving plate. Similarly, the coupling through hole of the fixed member needs to be formed in size enough for preventing the pressing members from mechanically interfering with an inner circumferential surface of the coupling through hole when the pressing member moves together with the first moving plate. Therefore, the pressing member and the coupling through hole need to be formed relatively large and it is difficult to realize a reduction in size of the projection position adjusting device. In particular, when the moving range in the axial direction of the first moving plate is set large, the size of the pressing member and the size of the coupling through hole are extremely large.

"One axial direction" may be any one of the first axial direction and the second axial direction. (The same holds true for "the other axial direction".) For simplification of explanation, "one axial direction" is set in a direction of a horizontal axis (a left to right direction) and "the other axial direction" is set in a direction of a vertical axis (an up to down direction).

In the aspect of the invention, the interposed member includes: the first pressing member having the first through hole extending in the left to right direction; the second pressing member having the second through hole; and the urging member arranged between the second pressing member and the step of the connecting member. When the first moving plate moves in the up to down direction, the first pressing member, the second pressing member, and the urging member move in the up to down direction together with the first moving plate. On the other hand, when the first moving plate moves in the left to right direction, the connecting member moves in the first through hole. Therefore, the first pressing member does not move and the second pressing member and the urging member move in the left to right direction together with the first moving plate while coming into slide contact with the first pressing member.

As explained above, the first pressing member is configured to move only in the up to down direction. Therefore, because it is unnecessary to take into account a moving range in the left to right direction of the first moving plate, it is possible to set the size in the left to right direction in the step of the coupling through hole small. It is possible to set the size in the left to right direction of the first pressing member substantially the same as the size in the left to right direction in the step of the coupling through hole. Moreover, the second pressing member only has to have a dimension enough for not slipping out of the first through hole when the second pressing member moves with respect to the first pressing member.

Because the pressing member includes the two pressing members, i.e., the first pressing member and the second pressing member, compared with the pressing member including only one member, it is possible to form the pressing member and the coupling through hole relatively small and realize a reduction in size of the projection position adjusting device.

Preferably, the first through hole has a substantially rectangular shape, a long side direction of which extends along the one axial direction, a pair of flat surfaces opposed to and orthogonal to each other in the other axial direction are formed on an outer surface of the connecting member, and the pair of flat surfaces come into slide contact with the first through hole.

In the aspect of the invention, the connecting member has the pair of flat surfaces orthogonal to the up to down direction on the outer surface thereof. The pair of flat surfaces come into slide contact with the first through hole. Consequently, when the first moving plate moves in the up to down direction, the first pressing member is prevented from rotating in the plane orthogonal to the projecting direction by the pair of flat surfaces. It is possible to move the first pressing member in the up to down direction together with the first moving plate. Therefore, when the first moving plate moves in the up to down direction, the first pressing member does not rotate and slip out of the step. It is possible to maintain a state of attachment of the first moving plate to the fixed member satisfactory.

Preferably, the first moving plate is disposed in the projecting direction side with respect to the fixed member.

In the aspect of the invention, in the projection position adjusting device, the first moving plate is disposed on the projecting direction side with respect to the fixed member. The other members such as the second moving plate and the fixed member are not present on the projecting direction side of the first moving plate. Consequently, it is possible to adopt a configuration in which the projection optical device is detachably mountable on the first moving plate from the projecting direction side. When such a configuration is adopted, it is possible to easily carry out replacement of the projection optical device and realize improvement of convenience.

BRIEF DESCRIPTION OF THE DRAWINGS

The invention will be described with reference to the accompanying drawings, wherein like numbers reference like elements.

FIGS. 12A and 12B are diagrams for explaining the up to down motion according to the embodiment;

DETAILED DESCRIPTION OF EMBODIMENTS

An embodiment of the invention is explained below with reference to the accompanying drawings.

External Structure

Figure 1:
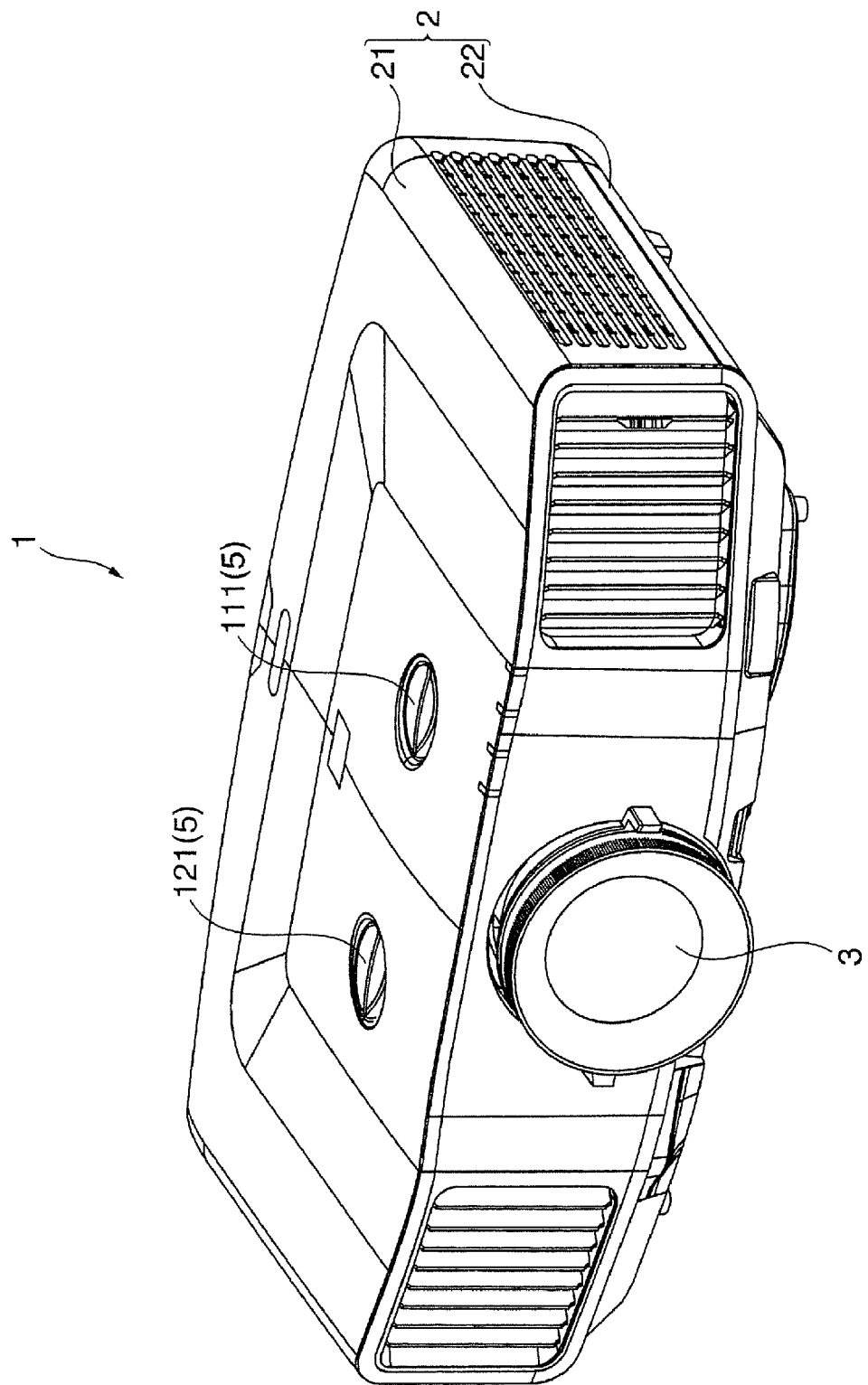
FIG. 1 is a perspective view of an external appearance of a projector according to an embodiment of the invention.

FIG. 1 is a perspective view of an external appearance of a projector 1 according to this embodiment. Specifically, FIG. 1 is a perspective view of the projector 1 set on a desk or the like viewed from the front upper side.

"Up", "down", "left", and "right" described below correspond to up, down, the left, and the right in the view shown in FIG. 1. "Front" and "back" described below correspond to the front and the back in the view shown in FIG. 1.

The projector 1 modulates, according to image information, a light beam emitted from a light source, forms image light, and magnifies and projects the formed image light on a screen (not shown). As shown in FIG. 1, the projector 1 includes an armor housing 2 that configures an armor.

The armor housing 2 houses an apparatus main body of the projector 1. As shown in FIG. 1, the armor housing 2 includes an upper case 21 that forms the top, the front, the back, and the sides of the projector 1 and a lower case 22 that forms the bottom, the front, the back, and the sides of the projector 1.

In the upper case 21, as shown in FIG. 1, a first dial 111 and a second dial 121, which configure a projection position adjusting device 5, are exposed to the top.

When the dials 111 and 121 are rotated by a user, a projection lens 3 moves in an up to down direction and a left to right direction and a position of a projected image (a projection position) on the screen is adjusted.

The detailed structure of the projection position adjusting device 5 is explained later.

Internal Structure

Figure 2:
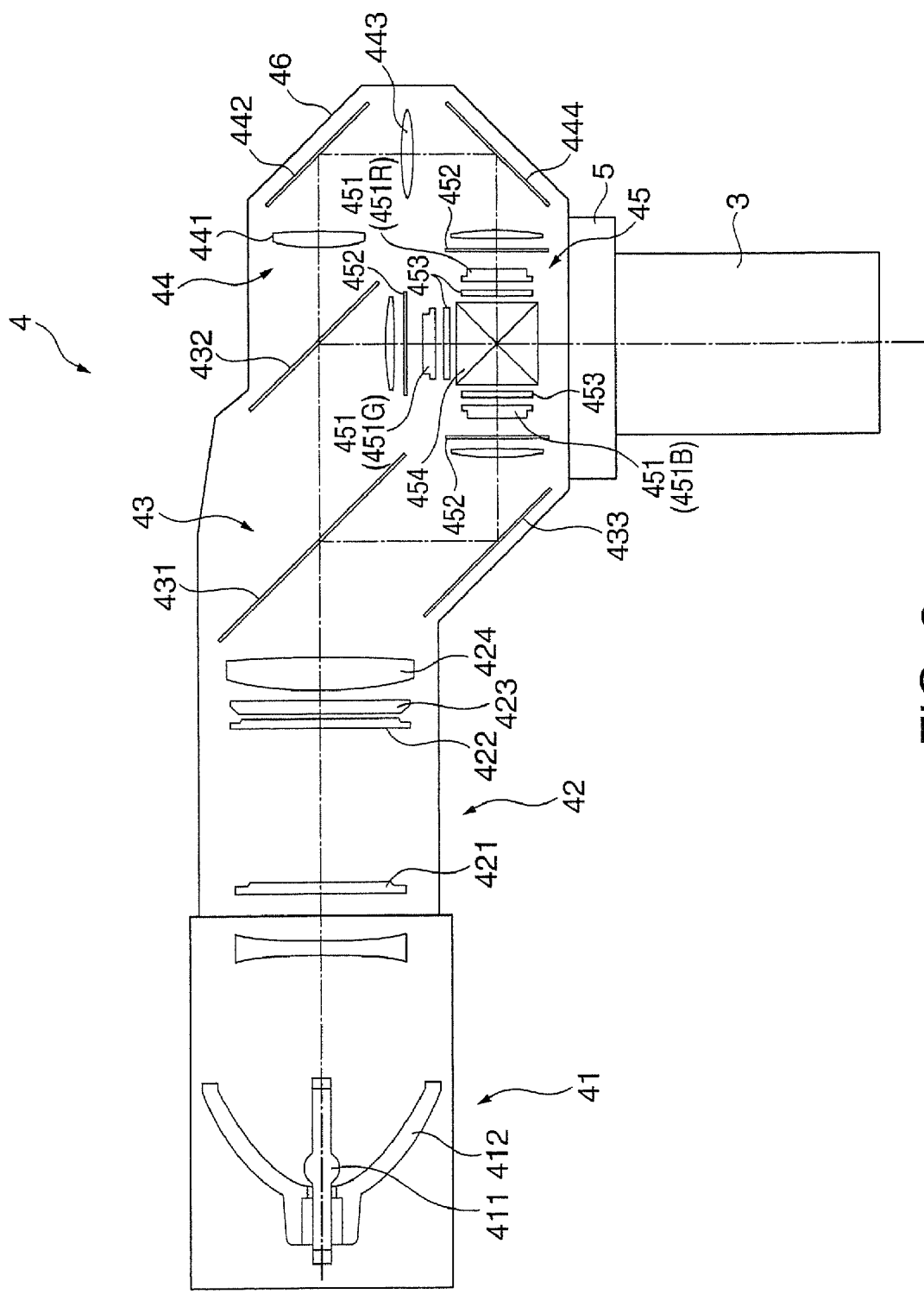
FIG. 2 is a schematic diagram of an apparatus main body housed in an armor housing according to the embodiment.

FIG. 2 is a schematic diagram of the apparatus main body housed in the armor housing 2. The apparatus main body shown in FIG. 2 is housed in the armor housing 2. The apparatus main body includes the projection lens 3 as a projection optical device, an optical unit 4, and the projection position adjusting device 5.

Although not specifically shown in the figure, in the armor housing 2, a cooling unit including a cooling fan that cools the inside of the projector 1, a power supply unit that supplies electric power to members of the projector 1, a control device that controls operations of the members of the projector 1, and the like are arranged in a space excluding the members 3 to 5.

Structure of the Projection Lens

As shown in FIG. 1, a distal end of the projection lens 3 is exposed from a substantial center portion in the front of the armor housing 2. The projection lens 3 magnifies and projects image light formed by the optical unit 4 on the screen.

Figure 5:
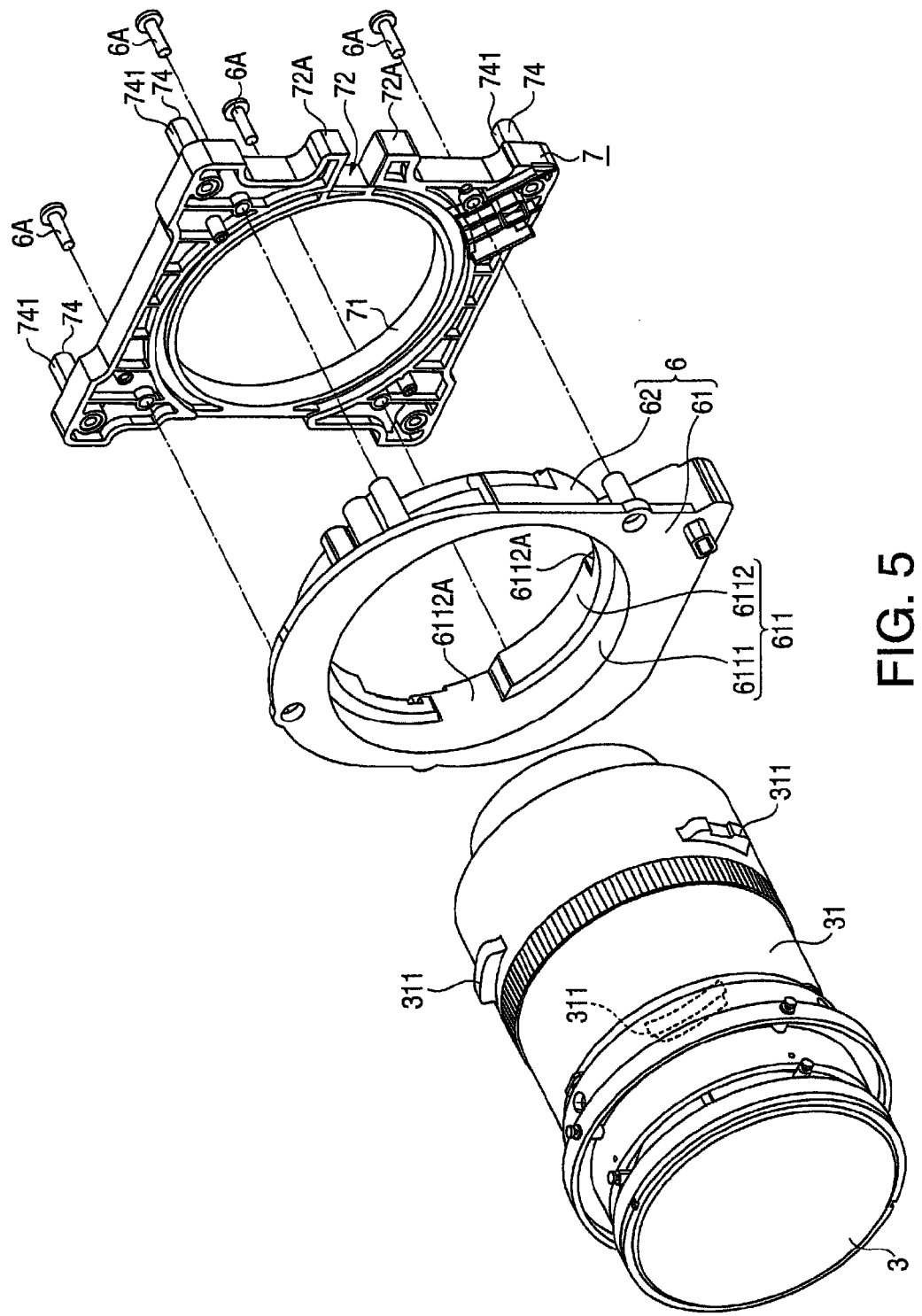
FIG. 5 is a disassembled perspective view of a lens connecting unit and a first moving plate according to the embodiment viewed from the front side.

Although not specifically shown in the figure, the projection lens 3 is configured as a set lens in which plural lenses are housed in a lens barrel 31 (see FIG. 5).

The projection lens 33 is connected to the projection position adjusting device 5 by three attachment projections 311 (see FIG. 5) formed on a proximal end side of the lens barrel 31 and is supported by the projection position adjusting device 5.

Structure of the Optical Unit

The optical unit 4 optically processes a light beam emitted from the light source and forms image light corresponding to image information under the control by the control device. As shown in FIG. 2, the optical unit 4 includes a light source device 41, an illumination optical device 42, a color-separation optical device 43, a relay optical device 44, an optical device 45, and an optical component housing 46 that houses the optical components 41 to 45.

As shown in FIG. 2, the light source device 41 includes a light source 411 and a reflector 412. In the light source device 41, an emitting direction of a light beam emitted from the light source 411 is aligned by the reflector 412. The light source device 41 emits the light beam to the illumination optical device 42.

As shown in FIG. 2, the illumination optical device 42 includes a first lens array 421, a second lens array 422, a polarization converting element 423, and a superimposing lens 424. The light beam emitted from the light source device 41 is divided into plural partial light beams by the first lens array 421 and focused near the second lens array 422. The partial light beams emitted from the second lens array 422 are made incident on an incident surface of the polarization converting element 423 such that a center axis (a main beam) thereof is perpendicular to the incident surface. The partial light beams are emitted by the polarization converting element 423 as a substantially one kind of linear polarized light. The plural partial light beams emitted from the polarization converting element 423 as the linear polarized light and transmitted through the superimposing lens 424 are superimposed on three liquid crystal panels 451 of the optical device 45 explained later.

As shown in FIG. 2, the color-separation optical device 43 includes two dichroic mirrors 431 and 432 and a reflection mirror 433. The color-separation optical device 43 has a function of separating the plural partial light beams emitted from the illumination optical device 42 into color lights of three colors, red, green, and blue, using the dichroic mirrors 431 and 432 and the reflection mirror 433.

As shown in FIG. 2, the relay optical device 44 includes an incidence side lens 441, a relay lens 443, and reflection mirrors 442 and 444. The relay optical device 44 has a function of guiding the color lights separated by the color-separation optical device 43, for example, the red light to a liquid crystal panel 451R on a red light side explained later.

The optical device 45 modulates an incident light beam according to image information and forms image light. As shown in FIG. 2, the optical device 45 includes liquid crystal panels 451 (a liquid crystal panel 451R on a red light side, a liquid crystal panel 451G on a green light side, and a liquid crystal panel 451B on a blue light side) as three optical modulation devices, incidence side sheet polarizers 452 arranged on an optical path pre-stage side of the liquid crystal panels 451, emission side sheet polarizers 453 arranged on an optical path post-stage side of the liquid crystal panels 451, and a cross dichroic prism 454 as a color-combination optical device.

The three incidence side sheet polarizers 452 transmit only polarized light having a polarization direction substantially the same as a polarization direction aligned by the polarization converting element 423 among the light beams separated by the color-separation optical device 43 and absorb the other light beams. The incidence side sheet polarizers 452 are configured by sticking polarization films on transmissive substrates.

The three liquid crystal panels 451 are formed by enclosing liquid crystal as an electro-optical substance in a pair of transparent glass substrates. An orientation state of the liquid crystal is controlled according to a driving signal from the control device. The liquid crystal panels 451 modulate the polarized light emitted from the incidence side sheet polarizers 452.

The three emission side sheet polarizers 453 have a function substantially the same as that of the incidence side sheet polarizers 452. The emission side sheet polarizers 453 transmit polarized light in a fixed direction among the light beams emitted via the liquid crystal panels 451 and absorb the other light beams.

The cross dichroic prism 454 combines the color lights modulated for each of the color lights emitted from the emission side sheet polarizers 453 and forms a color image. The cross dichroic prism 454 is formed in a substantial square shape in plan view obtained by bonding four rectangular prisms. Two dielectric multilayer films are formed in interfaces where the rectangular prisms are bonded. The dielectric multilayer films transmit the color light emitted from the liquid crystal panel 451G and transmitted through the emission side sheet polarizer 453 and reflect the color lights emitted from the liquid crystal panels 451R and 451B and transmitted through the emission side sheet polarizers 453. In this way, the color lights are combined and image light is formed. The image light formed by the cross dichroic prism 454 is emitted to the projection lens 3.

Structure of the Projection Position Adjusting Device

Figure 3:
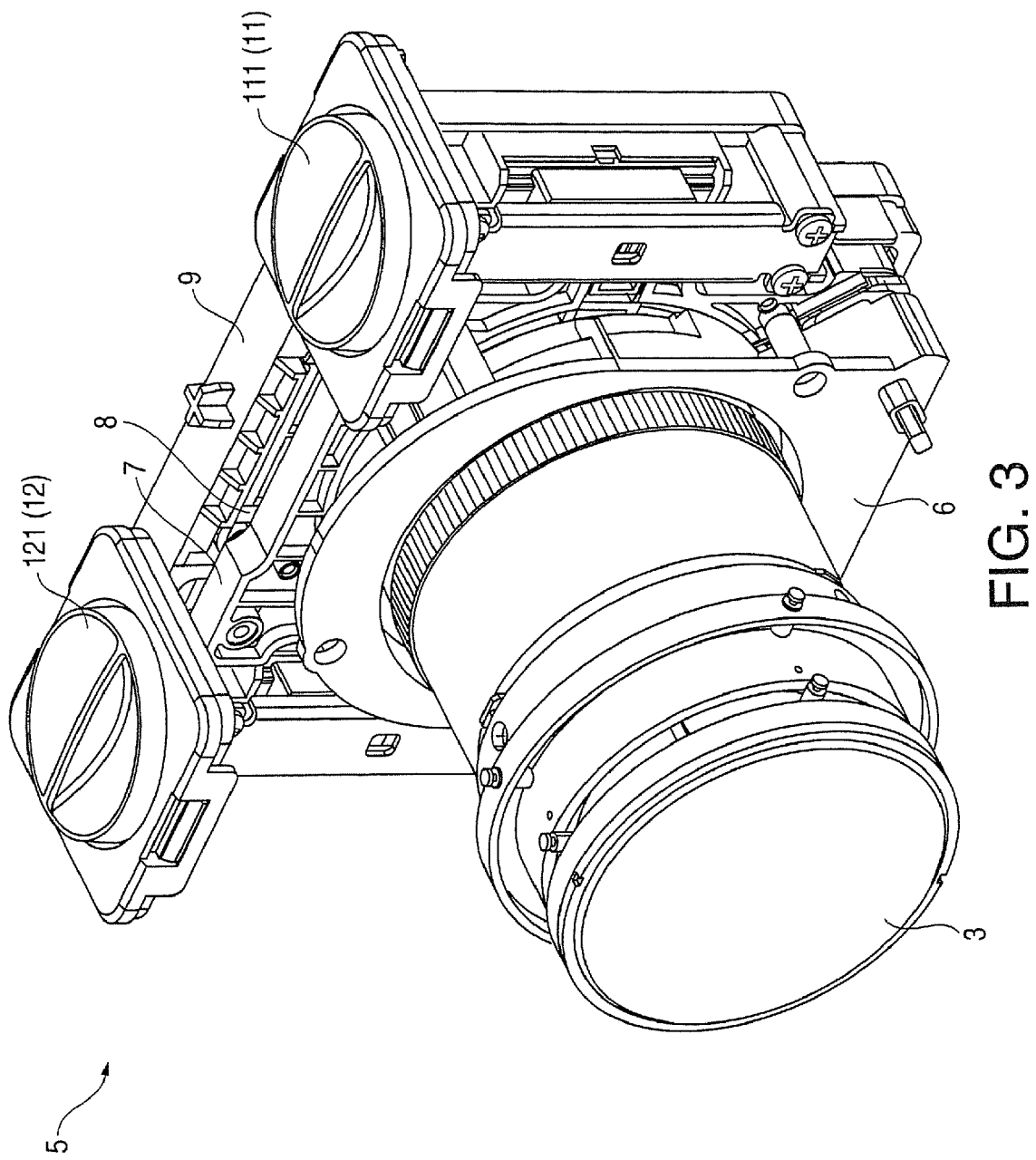
FIG. 3 is a perspective view of the structure of a projection position adjusting device according to the embodiment.
Figure 4:
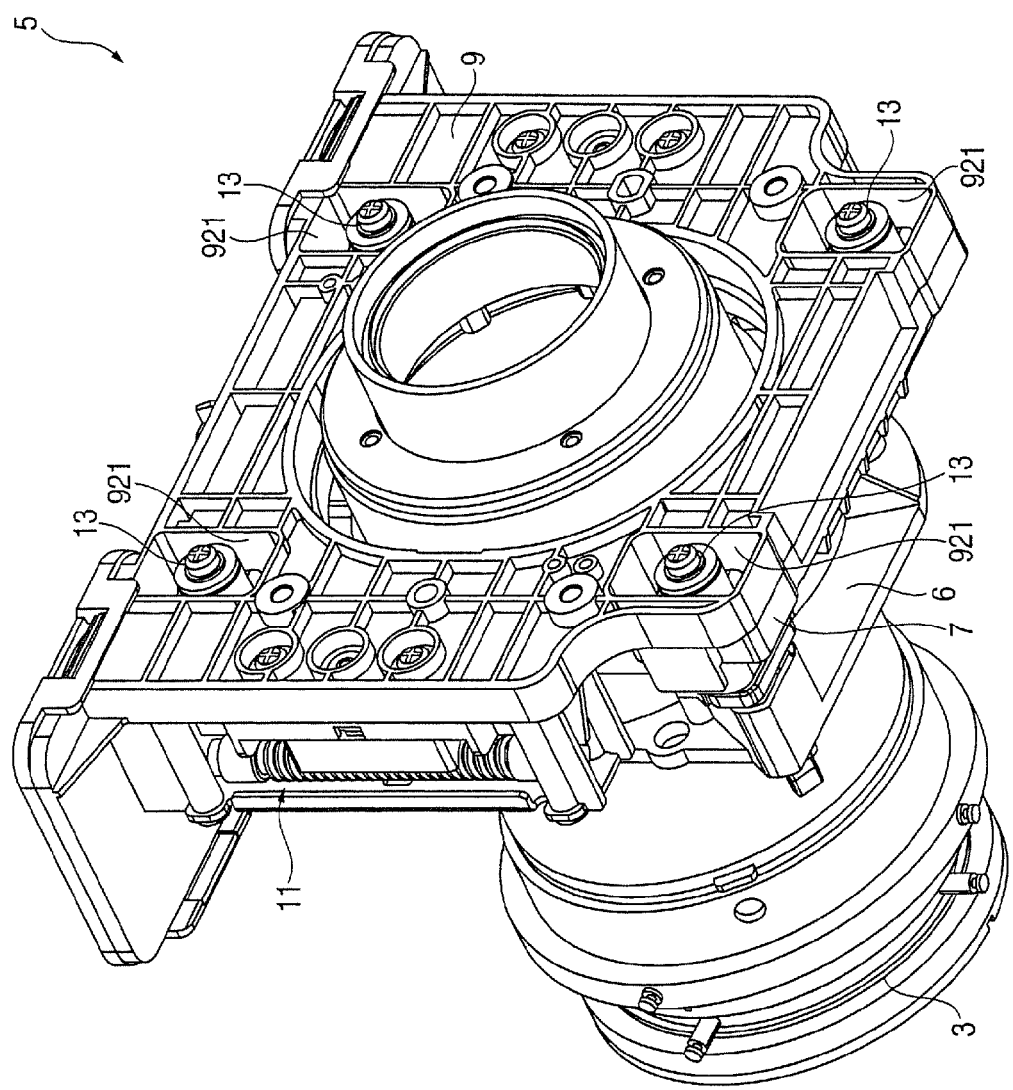
FIG. 4 is a perspective view of the structure of the projection position adjusting device according to the embodiment.

FIGS. 3 and 4 are perspective views of the structure of the projection position adjusting device 5. Specifically, FIG. 3 is a perspective view of the projection position adjusting device 5 viewed from the front side and FIG. 4 is a perspective view of the projection position adjusting device 5 viewed from the back side.

The projection position adjusting device 5 supports the projection lens 3 and moves the projection lens 3 in the up to down direction and the left to right direction to adjust a projection position of the projection lens 3. As shown in FIG. 3 or FIG. 4, the projection position adjusting device 5 includes a lens connecting unit 6, a first moving plate 7, a second moving plate 8 (FIG. 3), a fixed member 9, a first adjusting and driving unit 11, a second adjusting and driving unit 12 (FIG. 3), and four coupling members 13 (FIG. 4).

Structure of the Lens Connecting Unit

FIG. 5 is a disassembled perspective view of the lens connecting unit 6 and the first moving plate 7 viewed from the front side.

The lens connecting unit 6 is a member to which the projection lens 3 is connected. As shown in FIG. 5, the lens connecting unit 6 includes a tabular section 61 that has a lens through hole 611 substantially in the center thereof and a projecting section 62 of a cylindrical frame shape that extends from a circumferential portion of the lens through hole 611 to the back side of the tabular section 61. The lens through hole 611 includes a first lens through hole 6111 that is located on the front side and has a dimension larger than an outer diameter dimension of the lens barrel 31 and a second lens through hole 6112 that is located on the back side and has a dimension substantially the same as the outer diameter dimension of the lens barrel 31. The lens through hole 611 is formed in a stepped shape from the front side to the back side.

Three attachment recesses 6112A are formed in association with the three attachment projections 311 in an inner circumference of the second lens through hole 6112.

The three attachment recesses 6112A are formed in a substantial L shape by being cut out from the front side to the back side to be substantially flush with an inner circumference of the first lens through hole 6111 and cut out clockwise viewed from the front side around a center axis of the lens through hole 611.

With the configuration explained above, when the projection lens 3 is inserted through the lens through hole 611 with the three attachment projections 311 fit in the three attachment recesses 6112A and the projection lens 3 is rotated clockwise viewed from the front side, the projection lens 3 is connected to the lens connecting unit 6. In other words, the projection lens 3 and the lens connecting unit 6 are connected in the structure of a so-called bayonet type.

The lens connecting unit 6 is fixed by the first moving plate 7 by fixing screws 6A in four positions surrounding the lens through hole 611.

Structure of the First Moving Plate

As shown in FIG. 5, the first moving plate 7 is made of a plate member of a substantial rectangular shape in plan view. The first moving plate 7 is movable in the up to down direction (the first axial direction) and the left to right direction (the second axial direction) with an end face on the back side thereof coming into contact with the fixed member 9. The first moving plate 7 supports the projection lens 3 via the lens connecting unit 6 and moves to move the projection lens 3 in the up to down direction and the left to right direction.

In the first moving plate 7, an opening 71 that has a dimension substantially the same as the outer diameter dimension of the lens barrel 31 and allows the proximal end of the lens barrel 31 to be inserted through is formed substantially in the center thereof.

In the first moving plate 7, two projections 72a are formed substantially in the center in the up to down direction in the right side. A section between the projections 72A functions as an engaging recess 72 for engaging with a first slider 113 explained later that configures the first adjusting and driving unit 11.

Further, in the first moving plate 7, two first guide engaging holes 73 (see FIGS. 10A and 10B and FIGS. 12A and 12B) that are located on the right side near the engaging recess 72, extend along the up to down direction, and engage with the second moving plate 8 are formed in an end face on the back side.

Moreover, in the first moving plate 7, cylindrical coupling projections 74 are formed in four corner positions in the end face on the back side. Although not specifically shown in the figure, thread grooves for screwing with fixing screws 135 explained later of the coupling members 13 are formed in inner peripheral surfaces of the coupling projections 74. Flat surfaces 741 (see FIGS. 5, 11 and 13) along a horizontal surface (a surface orthogonal to the up to down direction) are formed on both the upper and lower sides of the coupling projections 74.

Structure of the Second Moving Plate

Figure 6:
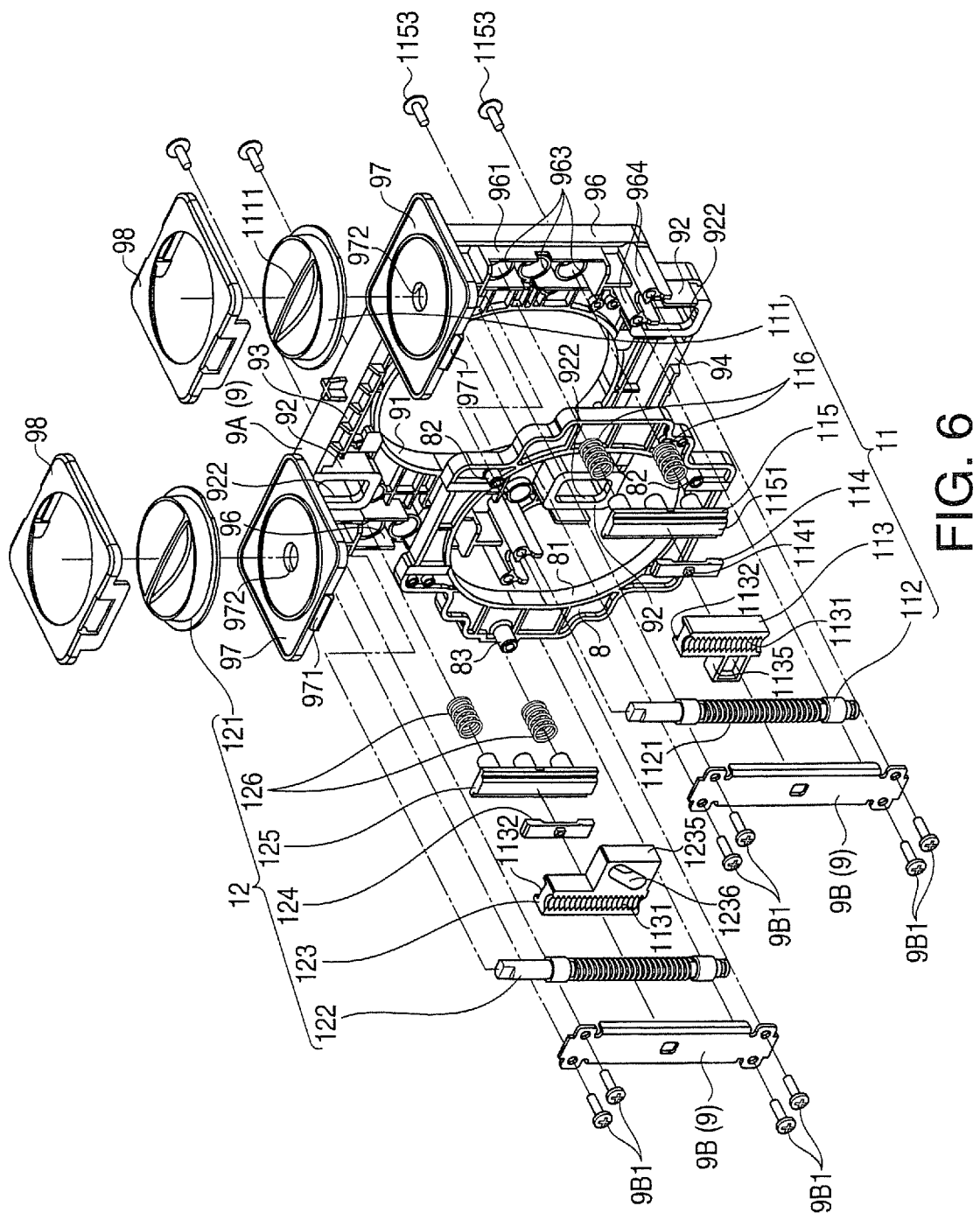
FIG. 6 is a disassembled perspective view of a second moving plate, a fixed member, a first adjusting and driving unit, and a second adjusting and driving unit according to the embodiment viewed from the front side.

FIG. 6 is a disassembled perspective view of the second moving plate 8, the fixed member 9, the first adjusting and driving unit 11, and the second adjusting and driving unit 12 viewed from the front side.

As shown in FIG. 6, the second moving plate 8 is made of a plate member of a substantial cross shape in plan view. The second moving plate 8 is movable in the left to right direction while coming into contact with the first moving plate 7 and the fixed member 9 between the first moving plate 7 and the fixed member 9. The second moving plate 8 engages with the first moving plate 7 and moves to move the first moving plate 7 in the left to right direction.

In the second moving plate 8, an opening 81 of a substantial elliptical shape that has a dimension in the left to right direction substantially the same as an inner diameter dimension of the opening 71 of the first moving plate 7, extends in the up to down direction, and allows the proximal end of the lens barrel 31 to be inserted through is formed substantially in the center.

In the second moving plate 8, two first columnar guide projections 82 inserted through the first guide engaging holes 73 are formed in association with the two first guide engaging holes 73 in end faces on the front side in upper and lower projecting sections.

Further, in the second moving plate 8, a columnar engaging projection 83 for engaging with a second slider 123 explained later, which configures the second adjusting and driving unit 12, is formed in an end face on the front side in a projection section on the left side.

Moreover, in the second moving plate 8, second guide projections 84 (see FIGS. 14A and 14B and FIGS. 16A and 16B) that are located on a straight line L (see FIGS. 14A and 14B and FIGS. 16A and 16B) substantially orthogonal to a center axis of the engaging projection 83 and along the left to right direction, extend along the left and right direction, and engage with the fixed member 9 are formed in end faces on the back side in left and right projecting sections.

Structure of the Fixed Member

The fixed member 9 is a member that is fixed in the projector 1 and supports the entire projection position adjusting device 5. As shown in FIG. 6, the fixed member 9 includes a fixed member main body 9A and two holding members 9B.

As shown in FIG. 6, the fixed member main body 9A is made of a plate member of a substantial rectangular shape in plan view.

In the fixed member main body 9A, an opening 91 that has a shape substantially the same as the opening 81 of the second moving plate 8 and allows the proximal end of the lens barrel 31 to be inserted through is formed substantially in the center.

In the fixed member main body 9A, swelling sections 92 that have a rectangular shape in plan view and swell to the front side are formed in four corner positions in an end face on the front side.

As shown in FIG. 4, in the fixed member main body 9A, recesses 921 of a rectangular shape in plan view dent to the front side are formed in association with the forming positions of the swelling sections 92 in an end face on the back side. The swelling sections 92 are formed in a container shape opened on the back side and can house the coupling members 13.

As shown in FIG. 6, openings 922 that have a dimension smaller than an opening dimension of the inside are formed in distal ends of the swelling sections 92.

In the swelling sections 92, coupling through holes 923 of a stepped shape that have steps 923A having a dimension smaller on the front side than on the back side are formed by the recesses 921 and the openings 922 (see FIGS. 11, 13, 15 and 17). The coupling through holes 923 are holes through which the coupling projections 74 of the first moving plate 7 are inserted.

The distal ends of the swelling sections 92 are formed of planes substantially orthogonal to the projecting direction.

With the configuration explained above, the end face on the back side of the first moving plate 7 comes into contact with the end faces at the distal ends of the swelling sections 92 in a state in which the coupling projections 74 are inserted through the coupling through holes 923.

In the fixed member main body 9A, an upper suspended section 93 suspended between the swelling sections 92 on the upper side and lower suspended section 94 suspended between the swelling sections 92 on the lower side are formed in the end face on the front side.

In the fixed member main body 9A, two second guide engaging holes 95 (see FIGS. 14A and 14B or FIGS. 16A and 16B) through which the second guide projections 84 are inserted are formed in association with the two second guide projections 84 on both the left and right sides across the opening 91 in the end face on the front side. As shown in FIGS. 14A and 14B or FIGS. 16A and 16B, the second guide engaging holes 95 are formed to have a length dimension in the left to right direction larger than that of the second guide projections 84.

With the configuration explained above, the second moving plate 8 is arranged in a loosely fit state in a space surrounded by the swelling sections 92, the upper suspended section 93, and the lower suspended section 94. The end face on the back side of the second moving plate 8 comes into contact with the end face on the front side of the fixed member main body 9A in a state in which the guide projections 84 are inserted through the guide engaging holes 95.

In the fixed member main body 9A, fixing sections 96 projecting to the outer side are formed on both the left and right sides, respectively. The fixing sections 96 are sections to which the first adjusting and driving unit 11 and the second adjusting and driving unit 12 are fixed, respectively.

Because the fixing sections 96 have the same shape, only the fixing section 96 on the right side is explained below.

A fitting section 961 that has a substantially rectangular frame shape and in which a first rail member 115 explained later of the first adjusting and driving unit 11 is fit is formed substantially in the center in an end face on the front side in the fixing section 96.

Three circular holes 962 (see FIG. 7) that pierce through end faces on the front side and the back side of the fixing section 96 and are arranged in parallel along the up to down direction are formed on the inner side of the fitting section 961.

Housing projections 963 (see FIGS. 6 and 7) that have a circular frame shape having a diameter dimension larger than that of the circular holes 962 and house first coil springs 116 explained later of the first adjusting and driving unit 11 are formed in peripheral edges of the circular holes 962.

In the fixing section 96, pairs of holding-member fixing sections 964 that project larger than the fitting section 961 to the front side and fix the holding member 9B are formed on both the upper and lower sides of the fitting section 961, respectively. In FIG. 6, only the pair of holding-member fixing sections 964 formed on the lower side are shown.

In the fixed member main body 9A, dial supporting sections 97 of a substantially rectangular shape in plan view that extend along the horizontal surface are formed on both the left and right sides of the end face on the upper side, respectively. The dial supporting sections 97 are sections on which dials 111 and 121 are placed, respectively. When dial attaching members 98 are engaged with hooks 971 from above the dial supporting sections 97, the dials 111 and 121 are attached to the dial supporting sections 97.

In the dial supporting sections 97, through holes 972 that pierce through in up to down direction and through which one end sides of a first worm 112 and a second worm 122 forming the adjusting and driving units 11 and 12 are inserted are formed substantially in the centers, respectively.

As shown in FIG. 6, the two holding members 9B are formed as substantially tabular member having the same shape. The holding members 9B are disposed on the front side of the fixed member main body 9A. When four fixing screws 9B1 are screwed in each of the holding-member fixing sections 964, members of the adjusting and driving sections 11 and 12 are held by the holding members 9B and the fixing sections 96, respectively.

Structure of the First Adjusting and Driving Unit

Figure 7:
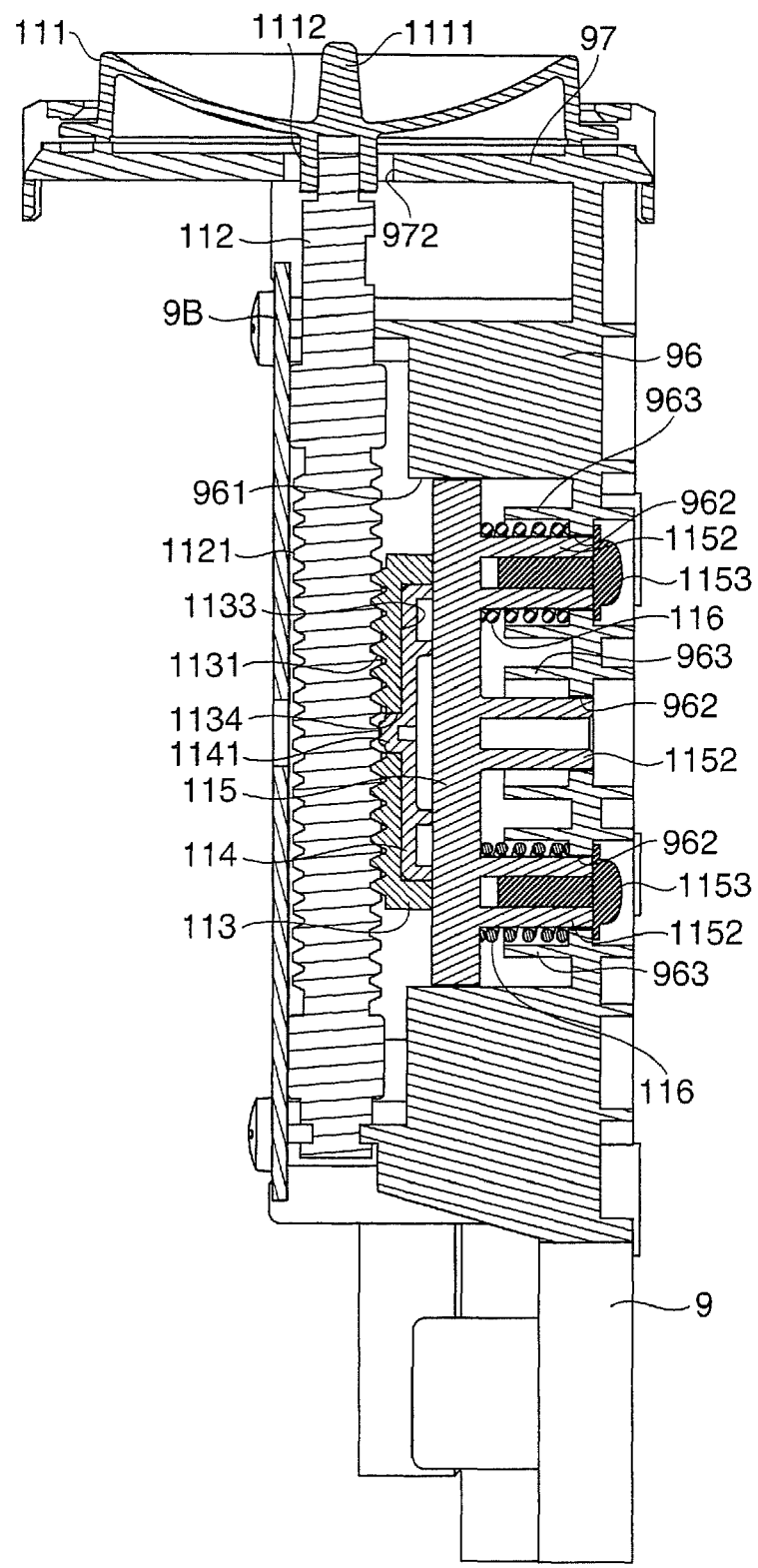
FIG. 7 is a longitudinal sectional view of the structure of the first adjusting and driving unit according to the embodiment.

FIG. 7 is a longitudinal sectional view of the structure of the first adjusting and driving unit 11.

The first adjusting and driving unit 11 is a unit that moves the first moving plate 7 in the up to down direction according to operation of the user and changes the projection position of the projection lens 3 in the up to down direction. As shown in FIG. 6 or FIG. 7, the first adjusting and driving unit 11 includes a first dial 111, a first worm 112, a first slider 113, a first leaf spring section 114, a first rail member 115, and two first coil springs 116.

The first dial 111 is an operation unit that is partially exposed from the top of an upper case 21 and operated by the user. As shown in FIG. 6 or FIG. 7, the first dial 111 has a substantially columnar shape and is placed on the dial supporting section 97 such that a columnar shaft thereof faces the up to down direction.

In the first dial 111, an end face on the upper side is formed in a concave shape dent in a substantially spherical shape. A tabular knob section 1111 that projects upward from the spherical surface and is operated by the user is formed on the end face on the upper side.

In the first dial 111, as shown in FIG. 7, a worm connecting section 1112 that is inserted through the through hole 972 of the dial supporting section 97 and connected to one end of the first worm 112 is formed substantially in the center of an end face on the lower side.

As shown in FIG. 6 or FIG. 7, the first worm 112 has a substantially columnar shape and crew threads 1121 are formed in a part of an outer circumference of the first worm 112. The first worm 112 is located on the holding member 9B side between the holding member 9B and the fixing section 96 and disposed such that a columnar shaft thereof faces the up to down direction. One end on the upper side of the first worm 112 is connected to the worm connecting section 1112 and the other end on the lower side thereof is connected between the pair of holding-member fixing sections 964 on the lower side.

The first worm 112 rotates around the columnar shaft together with the first dial 111 according to operation by the user.

As shown in FIG. 6 or FIG. 7, the first slider 113 is formed in a substantial rectangular parallelepiped shape and disposed on the back side of the first worm 112. The first slider 113 converts the rotational force of the first dial 111 and the first worm 112 into linear moving force and moves the first moving plate 7 in the up to down direction.

In the first slider 113, thread grooves 1131 that screw with the first worm 112 are formed in a flat surface on the front side opposed to the first worm 112. When the screw threads 1121 and the thread grooves 1131 are screwed, the first slider 113 moves in the up to down direction along an extending direction of the first worm 112 according to the rotation of the first worm 112.

In the first slider 113, as shown in FIG. 6, a concave section 1132 that extends along the up to down direction and engages with the first rail member 115 is formed in an end face on the back side.

A detailed shape of the concave section 1132 is the same as that of the second slider 123 explained later of the second adjusting and driving unit 12. Therefore, the detailed shape is explained in the explanation of the second adjusting and driving unit 12 later.

As shown in FIG. 7, a housing recess 1133 for housing the first leaf spring section 114 is formed at the bottom of the concave section 1132.

Further, in the first slider 113, as shown in FIG. 7, a through hole 1134 that pierces through the bottom of the housing recess 1133 and an end face on the front side thereof (the bottom of the thread grooves 1131) is formed substantially in the center in the up to down direction.

Moreover, in the first slider 113, a first engaging protrusion 1135 of a substantial rectangular parallelepiped shape (FIG. 6) that is inserted through the engaging recess 72 of the first moving plate 7 and engages with the engaging recess 72 is formed on a left side surface.

As shown in FIG. 6 or FIG. 7, the first leaf spring section 114 has a rectangular shape in plan view. Both the upper and lower sides of the first leaf spring section 114 come into contact with the first rail member 115 while being housed in the housing recess 1133. Substantially the center in the up to down direction of the first leaf spring section 114 moves back and forth along the projecting direction with both the upper and lower sides thereof as fulcrums.

In the first leaf spring section 114, a projection 1141 inserted through the through hole 1134 is formed substantially in the center in the up to down direction on an end face on the front side.

Although not specifically shown in the figure, when the first slider 113 is located near a reference position while the first leaf spring section 114 is housed in the housing recess 1133 and moves in the up to down direction together with the first slider 113, the projection 1141 is pressed to the opposite side of the projecting direction by a contact section having a height dimension larger than other sections in the screw threads 1121 of the first worm 112. When the first slider 113 reaches the reference position, the projection 1141 engages with a recess formed in the contact section and the pressed state of the first leaf spring section 114 by the contact section is released. When the pressed state is released, because the projection 1141 engages with the recess, slight vibration occurs in the first worm 112. The user senses the vibration in the first worm 112 via the first dial 111. The user rotates the first dial 111 to recognize that the first slider 113 reaches the reference position, i.e., the projection lens 3 reaches a reference position in the up to down direction.

The reference position is set in the center of a moving range in the up to down direction of the projection lens 3.

As shown in FIG. 6 or FIG. 7, the first rail member 115 is made of a plate member of a rectangular shape in plan view in association with the shape of the fitting section 961 and fits in the fitting section 961. The first rail member 115 engages with the first slider 113 in an end face on the front side and guides the movement in the up to down direction of the first slider 113.

In the first rail member 115, as shown in FIG. 6, a convex section 1151 that extends along the up to down direction in association with the concave section 1132 and engages with the concave section 1132 is formed in the end face on the front side.

A detailed shape of the convex section 1151 is the same as that of a second rail member 125 explained later of the second adjusting and driving unit 12. Therefore, the detailed shape is explained in the explanation of the second adjusting and driving unit 12 later.

In the first rail member 115, as shown in FIG. 7, three cylindrical through sections 1152 that have an outer diameter dimension substantially the same as an inner diameter dimension of the three circular holes 962 and are inserted through the third circular holes 962, respectively, are formed in an end face on the back side.

Although not specifically shown in the figure, thread grooves for screwing with fixing screws 1153 are formed in inner circumferential surfaces of the through sections 1152. The first rail member 115 is attached to the fixing section 96 by screwing the two fixing screws 1153 from distal ends of the two through sections 1152 on both the upper and lower sides in a state in which the through sections 1152 are inserted through the circular holes 962 and fit in the fitting section 961.

As shown in FIG. 7, the through sections 1152 are formed to have a projection dimension larger than a length dimension from the distal ends of the housing projections 963 to edges on the back side of the circular holes 962. Therefore, a gap is formed between the end face on the back side of the first rail member 115 and the distal ends of the housing projections 963 in a state in which screw heads of the fixing screws 1153 are in contact with peripheral edges of the circular holes 962. The first rail member 115 is movable by a distance of the gap along the projecting direction in a state in which the first rail member 115 is attached to the fixing section 96.

As shown in FIG. 7, the two first coil springs 116 are housed in the two housing projections 963 on both the upper and lower sides in a state in which the two through sections 1152 on both the upper and lower sides are inserted through the first coil springs 116. One ends of the first coil springs 116 come into contact with the peripheral edges of the circular holes 962 and the other ends thereof come into contact with the end face on the back side of the first rail member 115. The first coil springs 116 urge the first rail member 115 in the projecting direction.

Structure of the Second Adjusting and Driving Unit.

Figure 8:
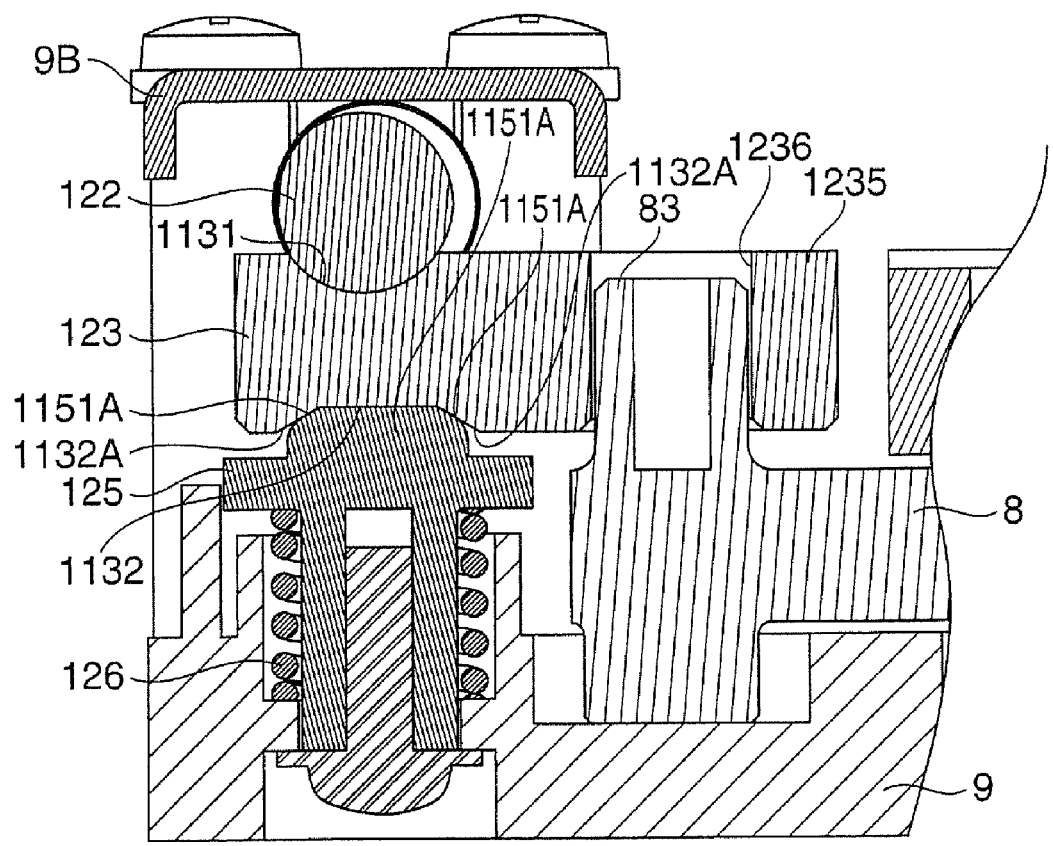
FIG. 8 is a transverse sectional view of the structure of the second adjusting and driving unit according to the embodiment.

FIG. 8 is a transverse sectional view of the structure of the second adjusting and driving unit 12.

The second adjusting and driving unit 12 is a unit that moves the second moving plate 8 in the left to right direction according to operation of the user and, when the first moving plate 7 moves in association with the movement of the second moving plate 8, changes the projection position of the projection lens 3 in the left to right direction. As shown in FIG. 6 or FIG. 8, the second adjusting and driving unit 12 includes the second dial 121 (FIG. 6), the second worm 122, the second slider 123, a second leaf spring section 124 (FIG. 6), a second ail member 125, and two second coil springs 126.

The members 121, 122, and 124 to 126 and the members 111, 112, and 114 to 116 of the first adjusting and driving unit 11 have the same shapes, respectively. Therefore, the second slider 123 is mainly explained below and explanation of the other members 121, 122, and 124 to 126 is omitted.

After the explanation of the second slider 123, a detailed shape of the convex section 1151 of the second rail member 125 is explained.

The second slider 123 converts the rotational force of the second dial 121 and the second worm 122 into linear moving force and moves the second moving plate 8 in the left to right direction.

As shown in FIG. 6 or FIG. 8, in the second slider 123, as in the first slider 113, the thread grooves 1131, the concave section 1132, the housing recess 1133 (not shown), and the through hole 1134 (no shown) are formed.

As shown in FIG. 8, the concave section 1132 is chamfered in corner sections on both the sides in the left to right direction to increase a width dimension in the left to right direction toward the back side and has slopes 1132A.

In the second slider 123, a second engaging protrusion 1235 of a substantial rectangular parallelepiped shape through which the engaging projection 83 of the second moving plate 8 is inserted and that engages with the engaging protrusion 83 is formed on the right side.

In the second engaging protrusion 1235, an inclining engaging hole 1236 that pierces through end faces on the front side and the back side and through which the engaging projection 83 is inserted is formed.

The inclining engaging hole 1236 is formed to cross the left to right direction and the up to down direction and extend from lower left to upper right in a plane orthogonal to the projecting direction (see FIG. 6, FIGS. 14A and 14B, and FIGS. 16A and 16B).

As shown in FIG. 8, the convex section 1151 corresponds to the concave section 1132. The convex section 1151 is chamfered in corner sections on both the sides in the left to right direction to increase a width dimension in the left to right direction toward the back side and has slopes 1151A.

Structure of the Coupling Members

Figure 9:
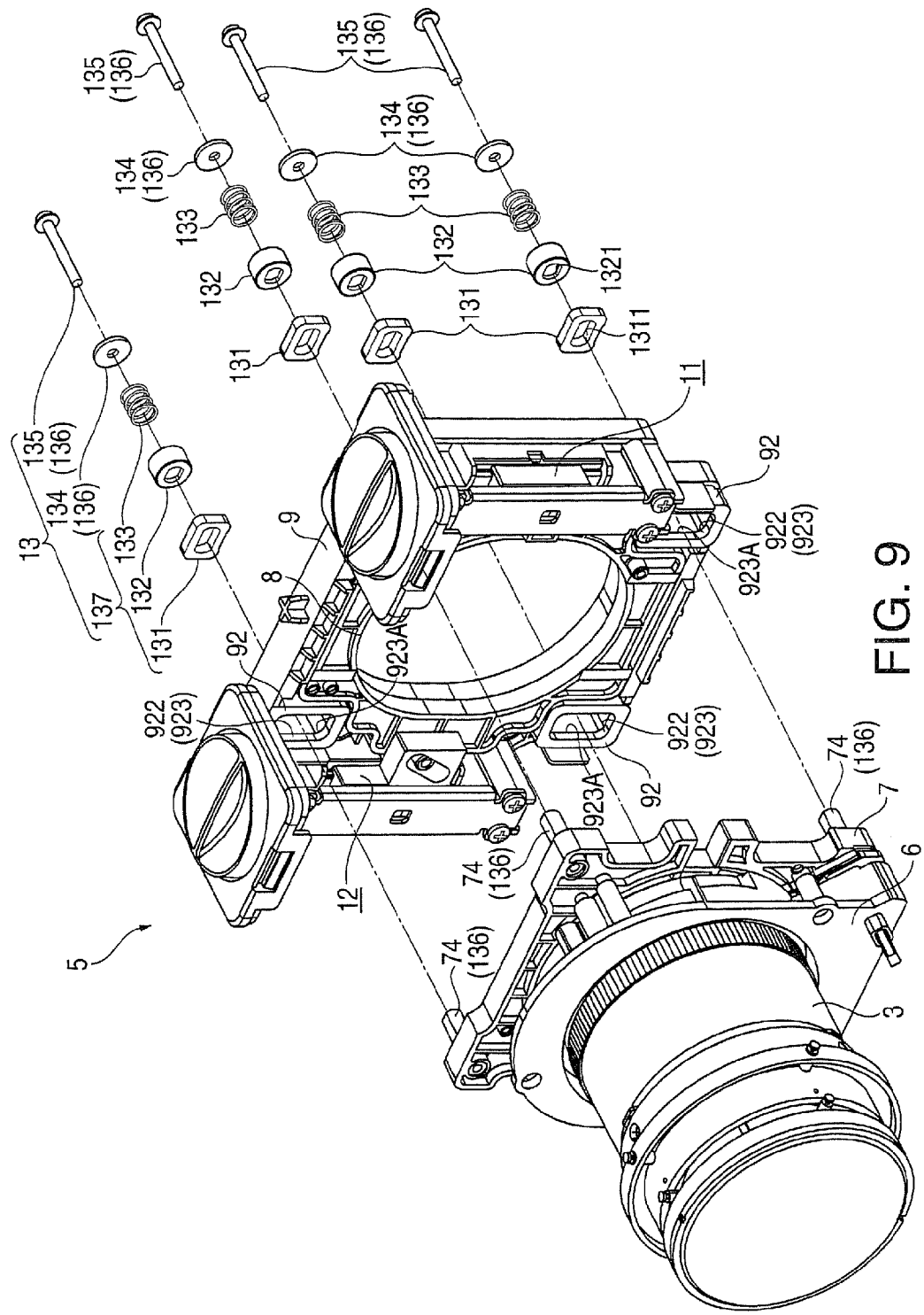
FIG. 9 is a disassembled perspective view of the first moving plate attached to the fixed member by four coupling members according to the embodiment viewed from the front side.

FIG. 9 is a disassembled perspective view of a state in which the first moving plate 7 is attached to the fixed member 9 by the four coupling members 13 viewed from the front side.

As shown in FIG. 9, the four coupling members 13 are disposed in the respective swelling sections 92 from the back side of the fixed member main body 9A. The coupling members 13 are connected to the coupling projections 74 inserted through the coupling through holes 923, respectively, and the steps 923A of the coupling through holes 923 and attach the first moving plate 7 to the fixed member 9. The coupling members 13 have the same structure. Each of the coupling members 13 includes a first pressing member 131, a second pressing member 132, an urging member 133, a washer 134, and a fixing screw 135.

The first pressing member 131 is a member that comes into contact with the step 923A of the coupling through hole 923 and is formed in a substantially rectangular shape. A length dimension in the left to right direction (a long side direction) of the first pressing member 131 is set substantially the same as an opening dimension in the left to right direction of the recess 921 (a dimension in the left to right direction of the step 923A). A length dimension in the up to down direction (a short side direction) thereof is set smaller than an opening dimension in the up to down direction of the recess 921 (a dimension in the up to down direction of the step 923A) (see FIGS. 11, 13, 15 and 17).

In the first pressing member 131, a first through hole 1311 that has a substantially rectangular shape extending in the left to right direction and through which the coupling projection 74 is inserted is formed substantially in the center. An inner diameter dimension in the up to down direction of the first through hole 1311 is set substantially the same as an outer diameter dimension in the up to down direction of the coupling projection 74 (a dimension between the flat surfaces 741). An inner diameter dimension in the left to right direction thereof is set larger than an outer diameter dimension in the left to right direction of the coupling projection 74 (see FIGS. 11, 13, 15 and 17).

The second pressing member 132 is a member that comes into contact with an end face on the back side in the first pressing member 131 and is formed in a bottomed cylindrical shape opened on the back side.

In the second pressing member 132, a second through hole 1321 that has an inner diameter dimension substantially the same as an outer diameter dimension of the coupling projection 74 and through which the coupling projection 74 is inserted is formed in a bottom section.

The urging member 133 is made of a coil spring and disposed in the second pressing member 132 in a state in which the coupling projection 74 is inserted through the urging member 133. One end of the urging member 133 comes into contact with the bottom section of the second pressing member 132 and the other end thereof comes into contact with the washer 134. The urging member 133 urges the washer 134 in a direction away from the second pressing member 132.

The fixing screw 135 is screwed from the distal end of the coupling projection 74 via the washer 134 in a state in which the coupling projection 74 is inserted through the coupling through hole 923, the first pressing member 131, the second pressing member 132, and the urging member 133. Consequently, the pressing members 131 and 132 are pressed against the step 923A of the coupling through hole 923 by the urging force of the urging member 133. The washer 134, the fixing screw 135, and the coupling projection 74 are pressed against the back side by the urging force. In other words, the first moving plate 7 is drawn to the back side and attached to the fixed member 9.

The coupling projection 74, the washer 134, and the fixing screw 135 are equivalent to, if integrated, a connecting member 136 according to this embodiment (see FIGS. 11, 13, 15 and 17) that is formed in a step shape having a sectional area smaller on the other end side (the front side) than on one side (the back side) and having a step (the washer 134) and is connected to the first moving plate 7 on the front side in a state in which the connecting member 136 is inserted through the coupling through hole 923.

The first pressing member 131, the second pressing member 132, and the urging member 133 are equivalent to an interposed member 137 according to this embodiment (see FIGS. 11, 13, 15 and 17) that is arranged between the washer 134 and the step 923A of the coupling through hole 923, urges the washer 134 and the step 923A in directions away from each other, and brings the first moving plate 7 into contact with the swelling section 92.

Operations of the Projection Position Adjusting Device

Operations of the projection position adjusting device 5 explained above are explained.

An up to down motion of the first moving plate 7 by the first adjusting and driving unit 11 and a left to right motion of the moving plates 7 and 8 by the second adjusting and driving unit 12 are explained below in order.

Up to Down Motion

Figure 10B:
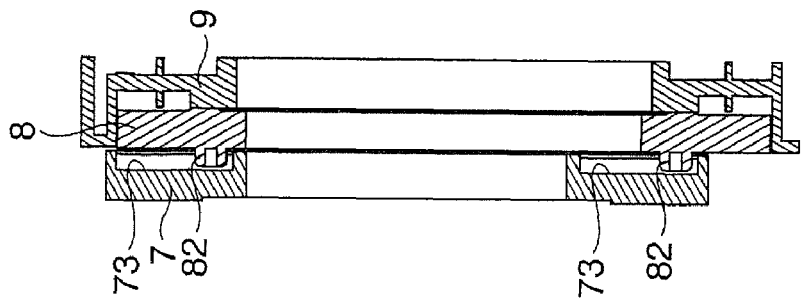
FIGS. 10A and 10B are diagrams for explaining an up to down motion according to the embodiment.
Figure 10A:
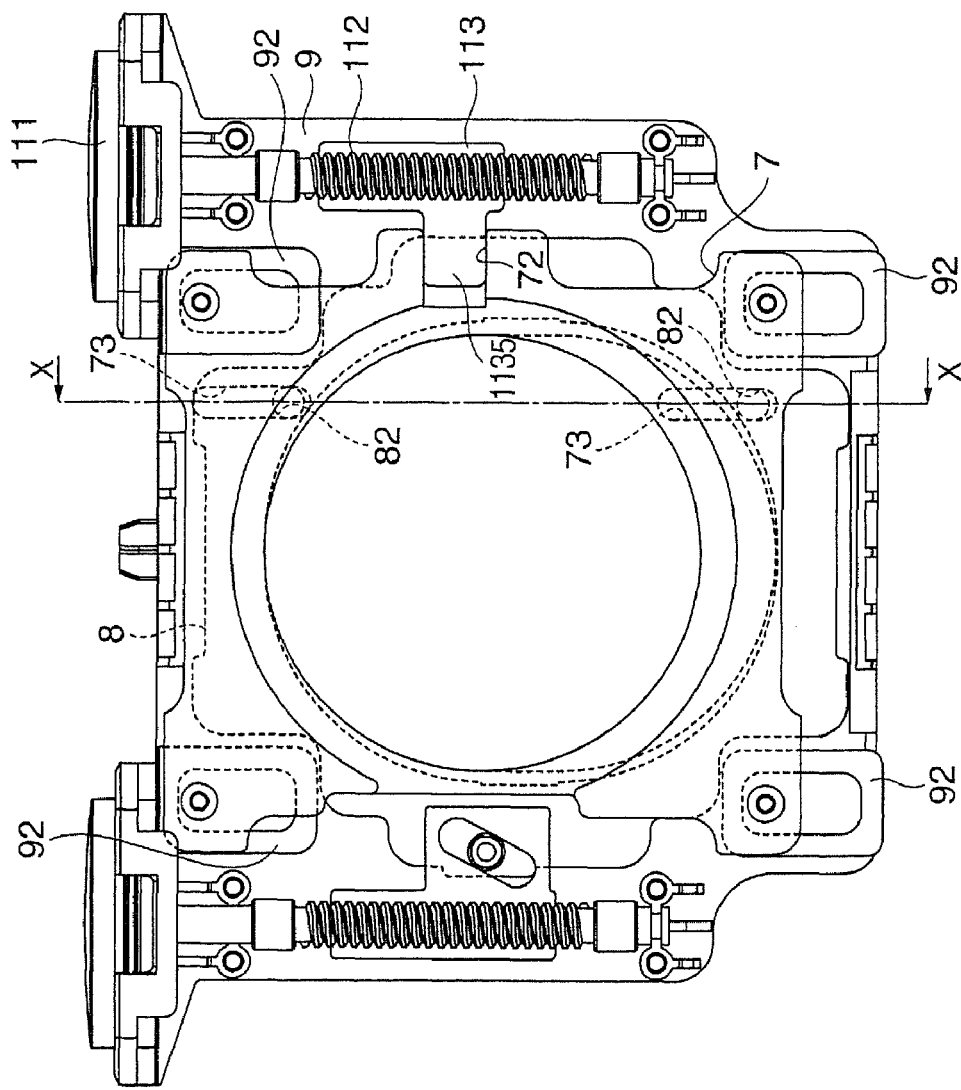
Figure 11:
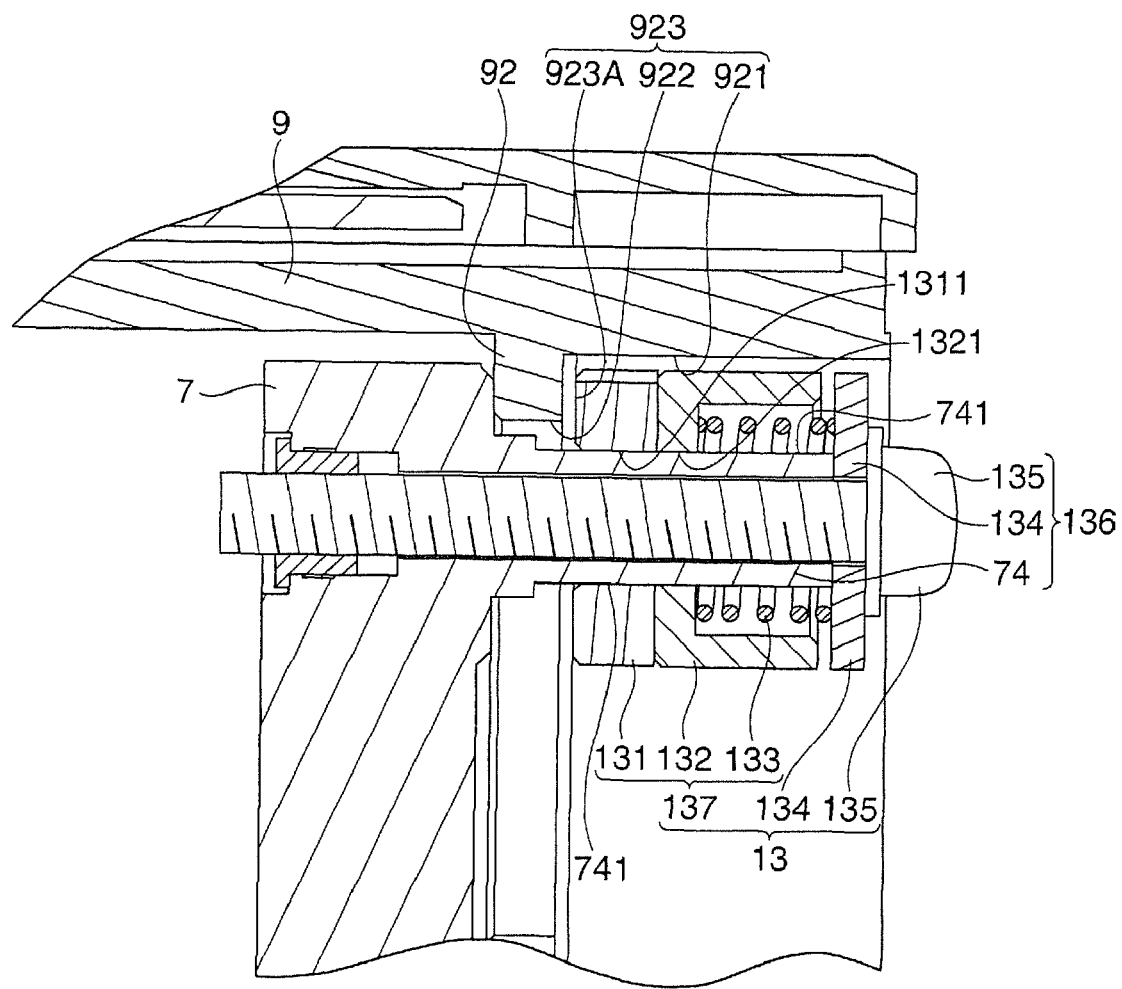
FIG. 11 is a diagram for explaining the up to down motion according to the embodiment.
Figure 13:
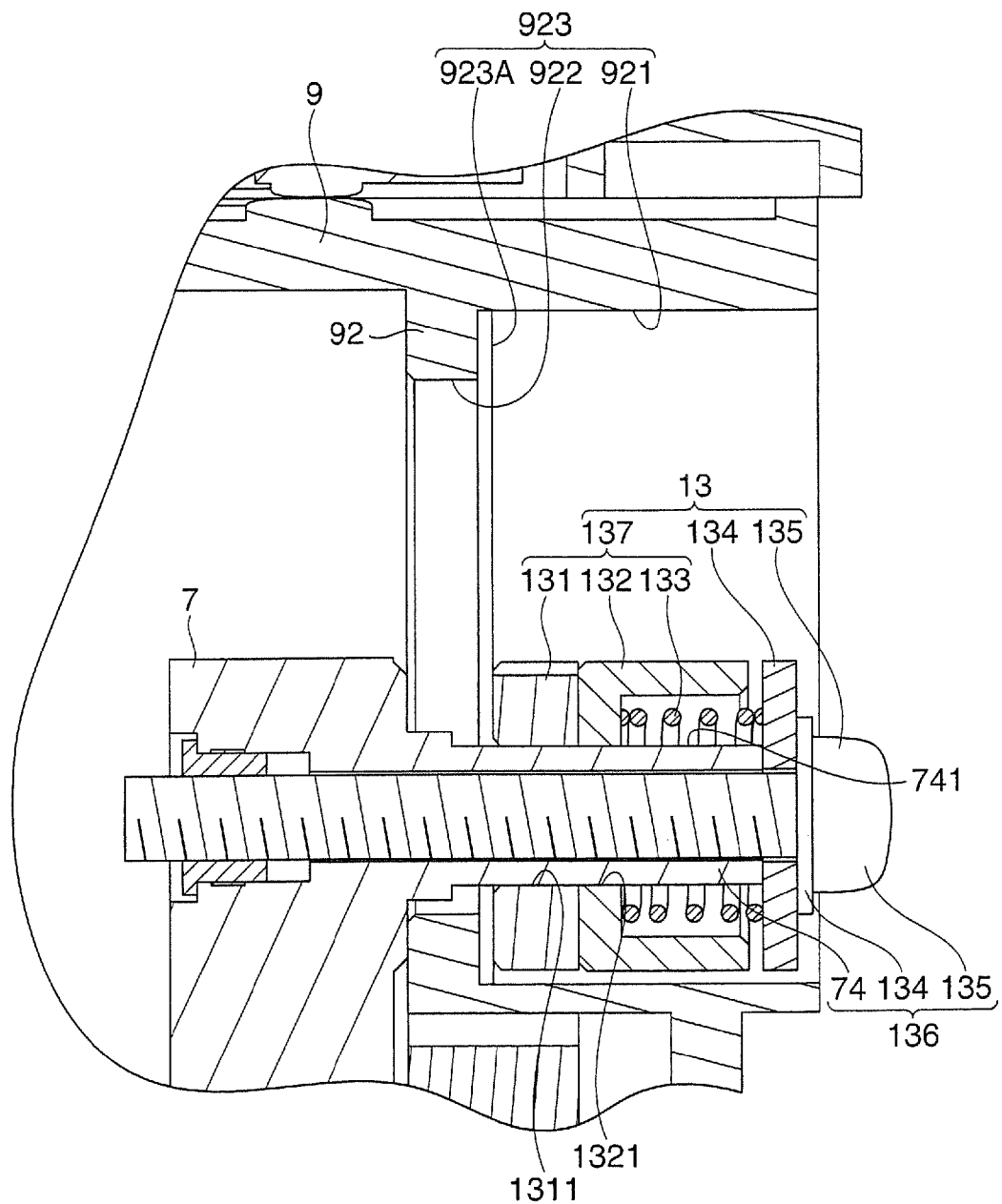
FIG. 13 is a diagram for explaining the up to down motion according to the embodiment.

FIGS. 10A and 10B to FIG. 13 are diagrams for explaining the up to down motion. Specifically, FIGS. 10A and 10B and FIG. 11 are diagrams of a state in which the first moving plate 7 moves to an upper side. FIGS. 12A and 12B and FIG. 13 are diagrams of a state in which the first moving plate 7 moves to a lower side. FIGS. 10A and 12A are diagrams viewed from the front side. FIGS. 10B and 12B are sectional views taken along a X-X line shown in FIG. 10A and a XII-XII line shown in FIG. 12A, respectively. FIGS. 11 and 13 are longitudinal sectional view of a state of the coupling member 13 on the upper left side among the four coupling members 13.

In FIGS. 10A and 10B and FIGS. 12A and 12B, for convenience of explanation, the projection lens 3 and the lens connecting unit 6 are not shown.

As shown in FIGS. 10A and 10B and FIGS. 12A and 12B, in a state in which the projection position adjusting device 5 is assembled, the first engaging protrusion 1135 and the engaging recess 72 are engaged. Therefore, when the first dial 111 is rotated by the user, the first moving plate 7 moves in the up to down direction in association with the first slider 113. When the first moving plate 7 moves, inner circumferences of the first guide engaging holes 73 come into slide contact with outer circumferences of the first guide projections 82 formed in the second moving plate 8 and the movement in the up to down direction of the first moving plate 7 is guided.

When the first moving plate 7 moves in the up to down direction, the projection position of the projection lens 3 connected to the first moving plate 7 via the lens connecting unit 6 is changed in the up to down direction.

In the coupling member 13, as shown in FIG. 11 or FIG. 13, both the upper and lower sides of the through holes 1311 and 1321 are in contact with the outer surfaces of the coupling projection 74 (the flat surfaces 741). Therefore, the first pressing member 131 and the second pressing member 132 move in association with the movement in the up to down direction of the first moving plate 7 while coming into contact with the step 923A of the coupling through hole 923.

The flat surfaces 741 of the coupling projection 74 are in contact with the inner surface of the first through hole 1311. Therefore, the first pressing member 131 moves in association with the movement in the up to down direction of the first moving plate 7 while coming into contact with the step 923A without rotating in the plane orthogonal to the projecting direction.

Left to Right Motion

Figure 14A:
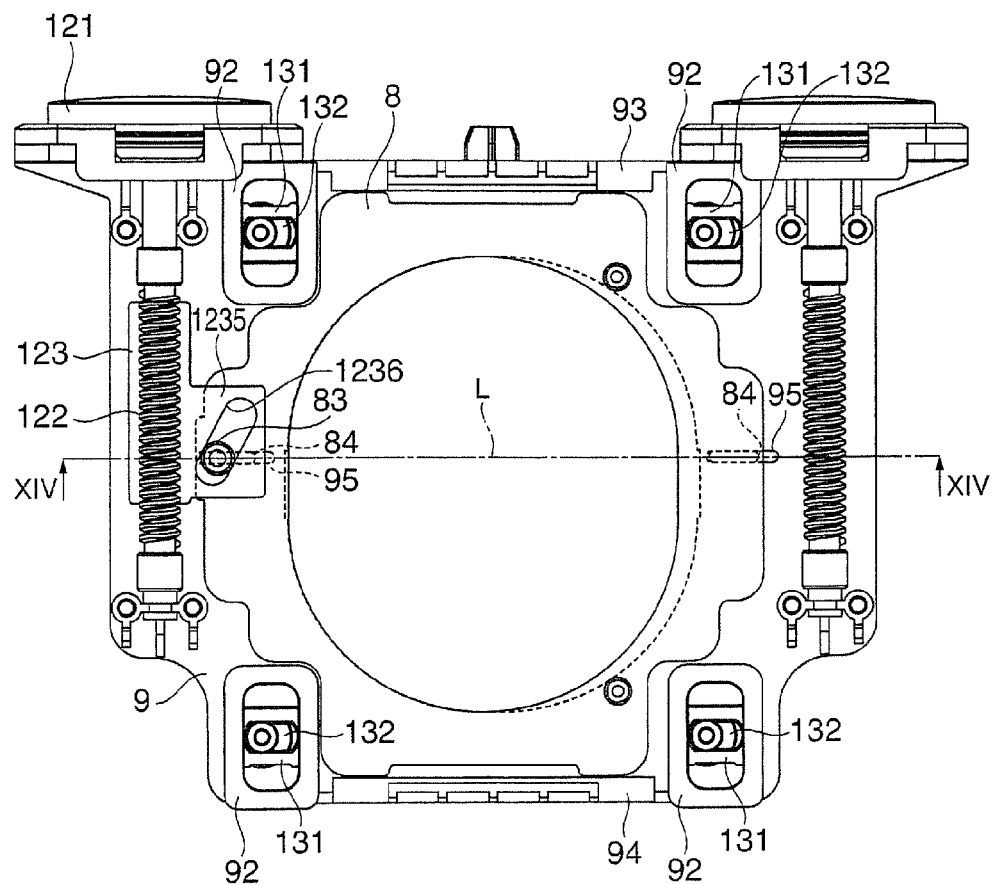
FIGS. 14A and 14B are diagrams for explaining a left to right motion according to the embodiment.
Figure 14B:
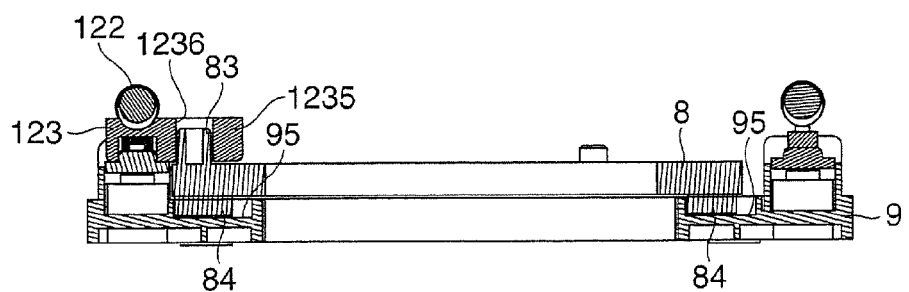
Figure 15:
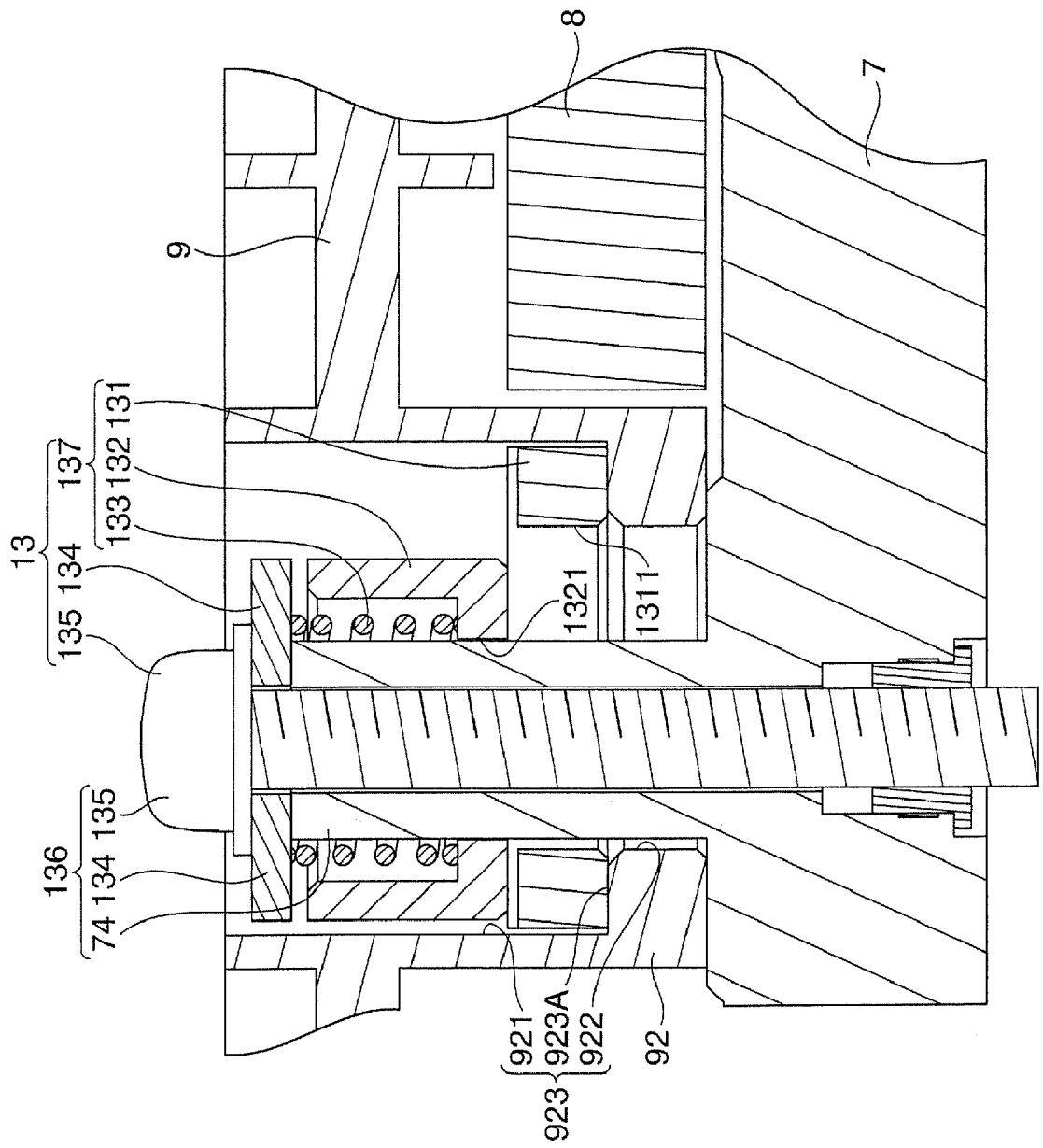
FIG. 15 is a diagram for explaining the left to right motion according to the embodiment.
Figure 16A:
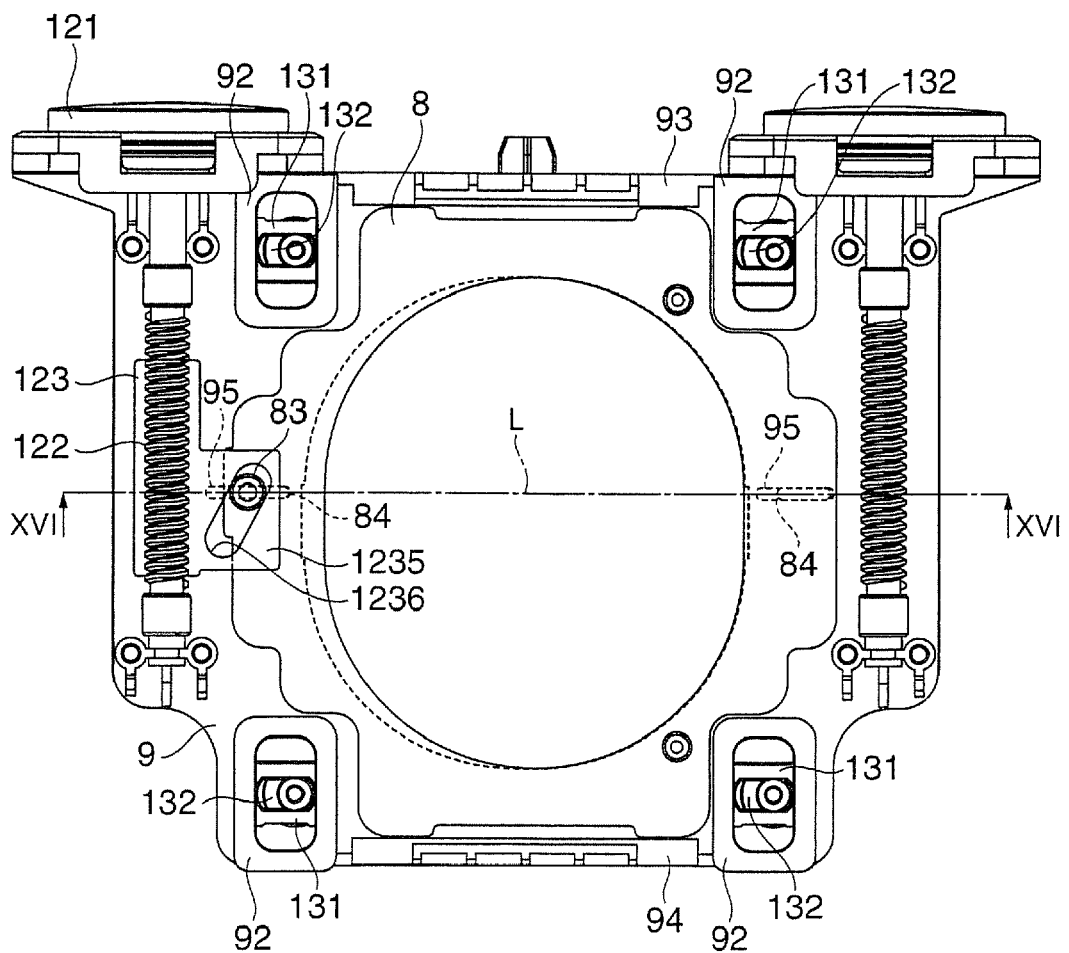
FIGS. 16A and 16B are diagrams for explaining the left to right motion according to the embodiment.
Figure 16B:
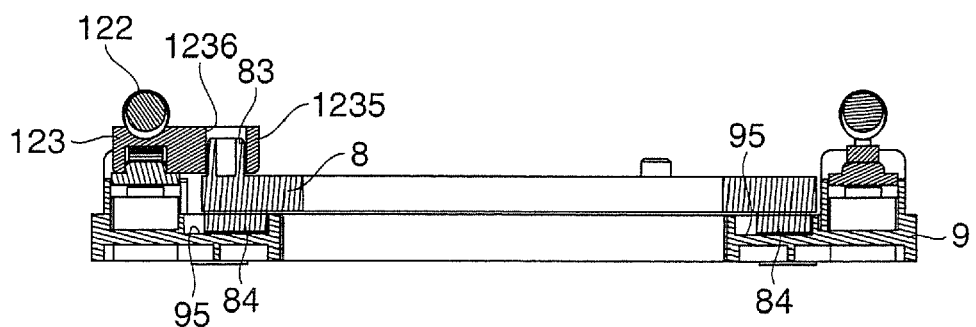
Figure 17:
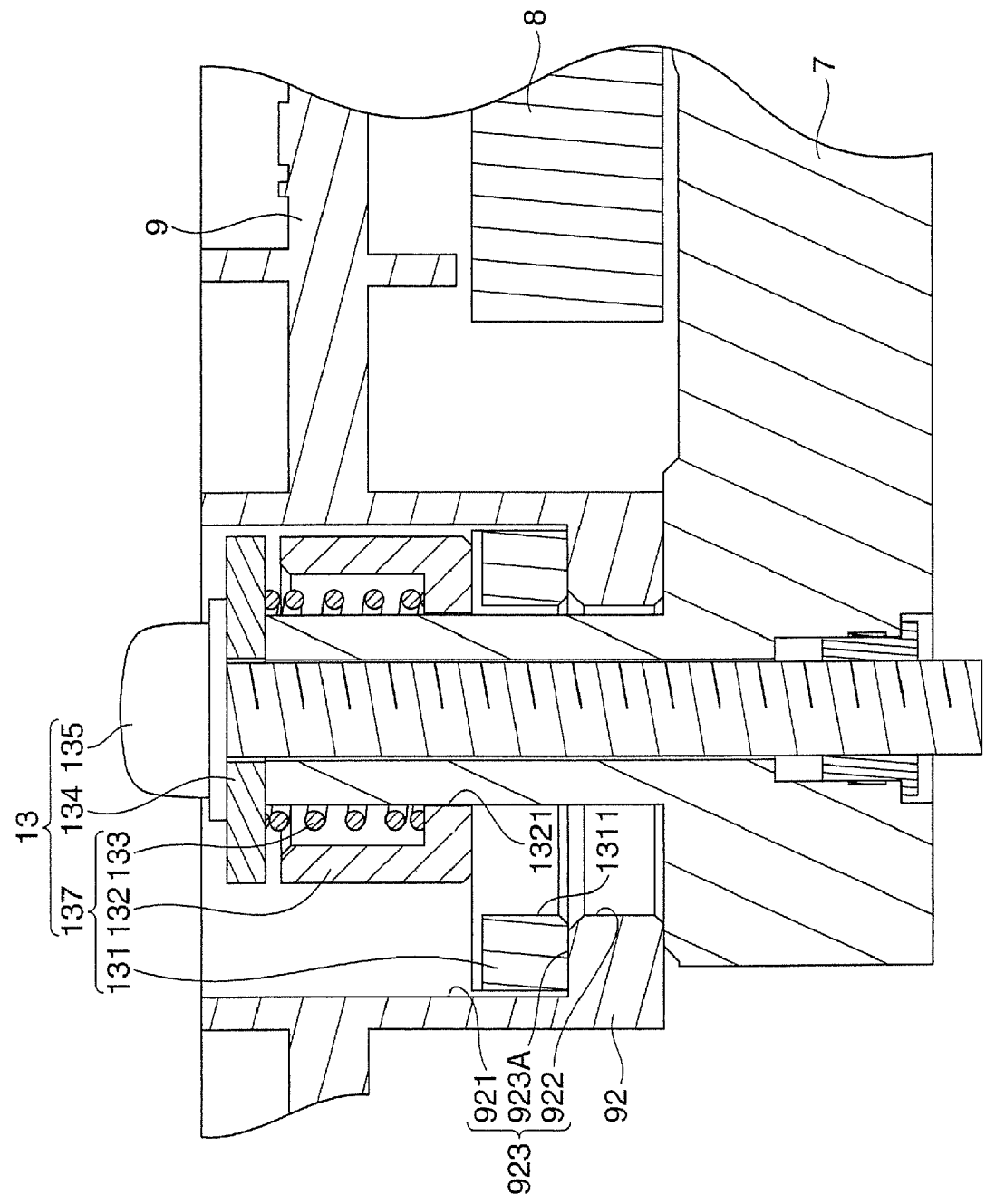
FIG. 17 is a diagram for explaining the left to right motion according to the embodiment.

FIGS. 14A and 14B to FIG. 17 are diagrams for explaining the left to right motion. Specifically, FIGS. 14A and 14B and FIG. 15 are diagrams of a state in which the second moving plate 8 moves to the left side. FIGS. 16A and 16B and FIG. 17 are diagrams of a state in which the second moving plate 8 moves to the right side. FIGS. 14A and 16A are diagrams viewed from the front side. FIGS. 14B and 16B are sectional views taken along a XIV-XIV line (a straight line L) shown in FIG. 14A and a XVI-XVI line (a straight line L) shown in FIG. 16A, respectively. FIGS. 15 and 17 are transverse sectional views of a state of the coupling member 13 on the upper left side among the four coupling members 13.

In FIGS. 14A and 14B and FIGS. 16A and 16B, for convenience of explanation, the first moving plate 7 and the first slider 113 are not shown in addition to the projection lens 3 and the lens connecting unit 6.

As shown in FIGS. 14A and 14B, in a state in which the projection position adjusting device 5 is assembled, the inclining engaging hole 1236 and the engaging projection 83 are engaged. Therefore, when the second dial 121 is rotated in a predetermined direction by the user and the second slider 123 moves to the upper side, the engaging projection 83 is guided in the inclined engaging hole 1236 and the second moving plate 8 moves to the left side. When the second moving plate 8 moves, outer circumferences of the second guide projections 84 come into slide contact with inner circumferences of the second guide engaging holes 95 formed in the fixed member 9 and both upper and lower end faces thereof come into contact with the suspended sections 93 and 94 formed in the fixed member 9. The movement to the left side of the second moving plate 8 is guided.

As shown in FIGS. 16A and 16B, when the second dial 121 is rotated in an opposite direction of the predetermined direction by the user and the second slider 123 moves to the lower side, the engaging projection 83 is guided in the inclining engaging hole 123 and, conversely to the above, the second moving plate 8 moves to the right side.

Because the first guide projections 82 and the first guide engaging holes 73 are engaged, when the second moving plate 8 moves in the left to right direction, the first moving plate 7 moves in association with the second moving plate 8. When the first moving plate 7 moves, because the first engaging protrusion 1135 moves in the left to right direction back and forth in the engaging recess 72, the first moving plate 7 is not disengaged from the first slider 113. The projection position of the projection lens 3 is changed in the left to right direction according to the movement in the left to right direction of the first moving plate 7.

In the coupling member 13, as shown in FIGS. 15 and 17, the first through hole 1311 is formed as a track hole that extends in the left to right direction and is larger than the outer surface of the coupling projection 74. Therefore, the first pressing member 131 does not move in association with the movement in the left to right direction of the first moving plate 7 and maintains a state in which the first pressing member 131 is in contact with the step 923A of the coupling through hole 923. On the other hand, because both the left and right sides of the second through hole 1311 are in contact with the outer surface of the coupling projection 74, the second pressing member 132 moves in association with the movement in the up to down direction of the first moving plate 7 while coming into slide contact with the end face on the back side of the first pressing member 131.

According to the embodiment explained above, there are effects explained below.

In this embodiment, the projection position adjusting device 5 includes the four coupling members 13 that couple the first moving plate 7 to be movable from the back side of the fixed member 9 to the fixed member 9. Consequently, unlike in the past, it is possible to attach the first moving plate 7 and the second moving plate 8 to the fixed member 9 using the four coupling members 13 without requiring the auxiliary plate that holds the first moving plate and the second moving plate between the auxiliary plate itself and the fixed member.

Each of the coupling member 13 include the connecting member 136 of the stepped shape that is inserted through the coupling through hole 923 of the stepped shape formed in the fixed member 9 and the end of which is connected to the first moving plate 7 and the interposed member 137 that is arranged between the washer 134 of the connecting member 136 and the step 923A of the coupling through hole 923, urges the washer 134 and the step 923A in directions away from each other, and brings the first moving plate 7 into contact with the swelling section 92. Consequently, unlike in the past, it is possible to urge the first moving plate 7 to the fixed member 9 (the four swelling sections 92) and bring into contact with the fixed member 9 using the coupling member 13 without requiring the plural urging members disposed between the first moving plate and the second moving plate.

As explained above, according to this embodiment, it is possible to omit the auxiliary plate and the plural urging members in the past and reduce the number of components and to realize a reduction in size and weight of the projection position adjusting device 5.

Moreover, because the first moving plate 7 is brought into contact with the fixed member 9 (the four swelling sections 92) by the plural coupling members 13, it is possible to prevent backlash of the first moving plate 7 (backlash of the projection lens 3 supported by the first moving plate 7). Even when the projection lens 3 is moved by the projection position adjusting device 5, it is possible to prevent shift of a back focus position of the projection lens 3 and stably maintain focus accuracy of a projected image projected from the projector 1.

The interposed member 137 includes the two pressing members 131 and 132 and the urging member 133. The first pressing member 131 is moved only in the up to down direction. Consequently, because a moving range in the left to right direction of the first moving plate 7 does not have to be taken into account, it is possible to set the size in the left to right direction in the step 923A of the coupling through hole 923 small. It is also possible to set the size in the left to right direction of the first pressing member 131 substantially the same as the size in the left to right direction in the step 923A. The second pressing member 132 only has to have a dimension enough for not slipping out of the first through hole 1311 when the second pressing member 132 moves with respect to the first pressing member 131.

Because the pressing member includes the two pressing members 131 and 132, compared with the pressing member including only one member, it is possible to form the pressing members 131 and 132 and the coupling through hole 923 relatively small and realize a reduction in size of the projection position adjusting device 5.

The connecting member 136 has the pair of flat surfaces 741 orthogonal to the up to down direction on the outer surfaces thereof. The pair of flat surfaces 741 come into slide contact with the first through hole 1311. Consequently, when the first moving plate 7 moves in the up to down direction, the first pressing member 131 is prevented from rotating in the plane orthogonal to the projecting direction by the pair of flat surfaces 741. It is possible to move the first pressing member 131 in the up to down direction together with the first moving plate 7. Therefore, when the first moving plate 7 moves in the up to down direction, the first pressing member 131 does not rotate and slip out of the step 923A. It is possible to maintain a state of attachment of the first moving plate 7 to the fixed member 9 satisfactory.

In the projection position adjusting device 5, the first moving plate 7 is disposed on the front side (the projecting direction side) with respect to the fixed member 9. The second moving plate 8 and the fixed member 9 are not present on the front side of the first moving plate 7. Consequently, it is possible to adopt a configuration in which the projection lens 3 is detachably mountable on the first moving plate 7 and the lens connecting unit 6 from the projecting direction side. Therefore, it is possible to easily carry out replacement of the projection lens 3 and realize improvement of convenience.

The invention is not limited to the embodiment. Modifications, alterations, and the like are included in the invention as long as the objects of the invention can be attained.

In the embodiment, a configuration of the adjusting and driving units 11 and 12 is not limited to that explained above. For example, the adjusting and driving units may include plural gears, links, and the like as in the past without using the worms 112 and 122 and the like.

In the embodiment, the first moving plate 7 is moved in the up to down direction and the second moving plate 8 is moved in the left to right direction by using the adjusting and driving units 11 and 12. However, the invention is not limited to this. For example, it is also possible to adopt the structure in which the first moving plate 7 is moved in the left to right direction by driving the first adjusting and driving unit 11 and the second moving plate 8 is moved in the up to down direction by driving the second adjusting and driving unit 12.

In the embodiment, the first pressing member 131 moves only in the up to down direction together with the first moving plate 7. However, the invention is not limited to this. For example, the first pressing member 131 may move only in the left to right direction together with the first moving plate 7. In this case, a length dimension in the up to down direction of the first pressing member 131 only has to be set substantially the same as the opening dimension in the up to down direction of the coupling through hole 923. A length dimension in the left to right direction only has to be set smaller than the opening dimension in the left to right direction of the coupling through hole 923.

In the embodiment, the pressing member urged to the step 923A by the urging member 133 includes the two pressing members, i.e., the first pressing member 131 and the second pressing member 132. However, the pressing member may include only one member.

In the embodiment, the projection position adjusting device 5 includes the four coupling member 13. However, the invention is not limited to this. The projection position adjusting device 5 may include two, three, or five or more coupling members.

In the embodiment, the connecting member 136 includes the coupling projection 74, the washer 134, and the fixing screw 135. However, the invention is not limited to this. The connecting member 136 only has to have a shape, which has a sectional area on one end side larger than that on the other end side connected to the first moving plate 7. For example, the coupling projection 74 and the washer 134 may be omitted and the connecting member 136 may include only the fixing screw 135.

In the embodiment, the interposed member 137 includes the three members, i.e., the first pressing member 131, the second pressing member 132, and the urging member 133. However, the invention is not limited to this. The interposed member 137 may include only one member made of cylindrical rubber or the like having elasticity.

In the embodiment, the coupling through hole 923 is formed as a rectangular opening. However, the invention is not limited to this. The coupling through hole 923 may be formed as a cutout of a C shape viewed from the front side or the back side by cutting out the side of the swelling section 92.

In the embodiment, the first moving plate 7 is disposed on the front side with respect to the fixed member 9. However, the invention is not limited to this. The first moving plate 7 may be disposed on the back side with respect to the fixed member 9.

In the embodiment, the transmissive liquid crystal panel is adopted as the optical modulation device. However, the invention is not limited to this. A reflective liquid crystal panel, a DMD (Digital Micromirror Device) (a trademark of Texas Instruments Incorporated in the United States), or the like.

In the embodiment, only an example of a front projection projector is explained. However, the invention is also applicable to a rear projection projector that includes a screen and projects light from the back side of the screen.

In the invention, it is possible to stably maintain focus accuracy of a projected image even when a projection position is adjusted and realize a reduction in size and weight. Therefore, it is possible to use the invention in projectors used for presentation and home theaters.

What is claimed is:

1. A projector comprising:
a projection optical device that magnifies and projects image light; and
a projection position adjusting device that moves the projection optical device in a plane orthogonal to a projecting direction and adjusts a projection position of the projection optical device, wherein
the projection position adjusting device includes:
a fixed member fixed in the projector;
a first moving plate that supports the projection optical device and moves in a first axial direction and a second axial direction orthogonal to each other in the plane orthogonal to the projecting direction;
a second moving plate that is interposed between the fixed member and the first moving plate, engages with the first moving plate, and moves in the second axial direction together with the first moving plate;
adjusting and driving units that move the first moving plate and the second moving plate; and
plural coupling members that movably couple the first moving plate to the fixed member,
the fixing member defining a coupling through hole of a stepped shape, which has a diameter dimension on a side closer to the first moving plate smaller than on a side further from the first moving plate and has a step, and
each of the coupling members includes:
a connecting member having one end side and an other end side and being formed in a stepped shape, the connecting member having a sectional area on the other end side smaller than that on the one end side, the other end side being connected to the first moving plate in a state in which the connecting member is inserted in the coupling through hole; and
an interposed member disposed between the step of the connecting member and a step of the coupling through hole urges the step of the connecting member and the step of the coupling through hole in directions away from each other, and brings the first moving plate into contact with the fixed member.

2. The projector according to claim 1,
the interposed member including:
a first pressing member that has a first through hole through which the connecting member is inserted and the connecting member is movable in one of the axial directions, and moves in the other axial direction together with the first moving plate while coming into contact with the step of the coupling through hole;
a second pressing member that has a second through hole through which the connecting member is inserted, moves in the other axial direction together with the first pressing member, and moves in the one axial direction together with the first moving plate with respect to the first pressing member while coming into contact with the first pressing member; and
an urging member that is arranged between the second pressing member and the step of the connecting member and urges the second pressing member and the step of the connecting member in directions away from each other.

3. The projector according to claim 2,
the first through hole having a substantially rectangular shape, a long side direction of which extends along the one axial direction,
a pair of flat surfaces opposed to and orthogonal to each other in the other axial direction being formed on an outer surface of the connecting member, and
the pair of flat surfaces coming into slide contact with the first through hole.

4. The projector according to claim 1, the first moving plate being disposed in a projecting direction side with respect to the fixed member.

* * * * *